(12) United States Patent
Friday et al.

(10) Patent No.: US 9,967,803 B2
(45) Date of Patent: May 8, 2018

(54) DYNAMIC VIRTUAL BEACON METHODS AND APPARATUS

(71) Applicant: Mist Systems, Inc., Cupertino, CA (US)

(72) Inventors: Robert Friday, Los Gatos, CA (US); Neal Dante Castagnoli, Morgan Hill, CA (US); Randall Wayne Frei, San Jose, CA (US)

(73) Assignee: Mist Systems, Inc., Cupertino, CA (US)

( * ) Notice: Subject to any disclaimer, the term of this patent is extended or adjusted under 35 U.S.C. 154(b) by 46 days.

(21) Appl. No.: 15/175,020

(22) Filed: Jun. 6, 2016

(65) Prior Publication Data
US 2017/0273008 A1 Sep. 21, 2017

Related U.S. Application Data

(63) Continuation-in-part of application No. 14/850,725, filed on Sep. 10, 2015, now Pat. No. 9,743,254, which
(Continued)

(51) Int. Cl.
*H04W 48/08* (2009.01)
*H04W 4/02* (2018.01)
(Continued)

(52) U.S. Cl.
CPC ........... *H04W 48/08* (2013.01); *G01S 5/0273* (2013.01); *G01S 5/0278* (2013.01); *H04B 17/27* (2015.01);
(Continued)

(58) Field of Classification Search
CPC ... H04W 16/28; H04W 4/025; H04W 72/085; H04W 48/08
See application file for complete search history.

(56) References Cited

U.S. PATENT DOCUMENTS 5,293,642 A 3/1994 Lo
5,734,977 A 3/1998 Sanmugam
(Continued)

FOREIGN PATENT DOCUMENTS

EP 2268066 A1 12/2010
WO 2009122000 A1 10/2009
(Continued)

OTHER PUBLICATIONS

Notification of Transmittal of The International Search Report and The Written Opinion of The International Searching Authority or the Declaration, International Search Report and Written Opinion of the International Searching Authority from PCT/US2016/030324, dated Aug. 18, 2016 1-8 pages.
(Continued)

*Primary Examiner* — Wei Zhao
(74) *Attorney, Agent, or Firm* — Straub & Straub; Michael P. Straub; Stephen T. Straub

(57) ABSTRACT

Methods and apparatus relating to use of actual and/or virtual beacons are described. Virtual beacons are virtual in that an actual beacon need not be transmitted but a rather a virtual beacon transmitter at a desired location may be considered to transmit virtual beacons. Beacon transmitter information indicates transmission power and location of actual and virtual beacon transmitters as well as information to be communicated by virtual beacons and is dynamically updated based on device movement, a schedule and/or the locations of devices in a group. Virtual personal beacons, virtual group beacons and virtual scheduled beacons are supported. A virtual personal beacon transmitter location is updated as the location of a device corresponding to the person moves. Reception of a virtual beacon is reported in a message sent to a wireless terminal or a component of the
(Continued)

wireless terminal which acts upon receiving an indication of beacon reception.

25 Claims, 11 Drawing Sheets

Related U.S. Application Data is a continuation-in-part of application No. 14/811,684, filed on Jul. 28, 2015, and a continuation-in-part of application No. 14/811,689, filed on Jul. 28, 2015, now Pat. No. 9,363,784.

(60) Provisional application No. 62/197,980, filed on Jul. 28, 2015, provisional application No. 62/155,428, filed on Apr. 30, 2015.

(51) Int. Cl.
| | |
|---|---|
| *H04W 16/28* | (2009.01) |
| *H04W 72/08* | (2009.01) |
| *G01S 5/02* | (2010.01) |
| *H04W 4/04* | (2009.01) |
| *H04W 52/24* | (2009.01) |
| *H04W 64/00* | (2009.01) |
| *H04B 17/27* | (2015.01) |
| *H04B 17/318* | (2015.01) |
| *H04B 17/373* | (2015.01) |

(52) U.S. Cl.
CPC ......... *H04B 17/318* (2015.01); *H04B 17/373* (2015.01); *H04W 4/025* (2013.01); *H04W 4/043* (2013.01); *H04W 16/28* (2013.01); *H04W 52/242* (2013.01); *H04W 64/00* (2013.01); *H04W 72/085* (2013.01)

(56) References Cited

U.S. PATENT DOCUMENTS

| | | | |
|---|---|---|---|
| 5,946,612 | A | 8/1999 | Johansson |
| 6,304,515 | B1 | 10/2001 | Spiesberger |
| 6,707,422 | B2 | 3/2004 | Sheynblat et al. |
| 6,928,296 | B2 | 8/2005 | Kanemoto et al. |
| 7,058,359 | B1 | 6/2006 | Doyle et al. |
| 7,079,850 | B2 | 7/2006 | Cameron |
| 7,110,771 | B2 | 9/2006 | Fisher |
| 7,110,772 | B1 | 9/2006 | Wu |
| 7,200,392 | B2 | 4/2007 | Kennedy, Jr. et al. |
| 7,598,856 | B1 | 10/2009 | Nick et al. |
| 7,689,240 | B2 | 3/2010 | Anderson |
| 8,131,312 | B2 | 3/2012 | Levin et al. |
| 8,738,024 | B1 | 5/2014 | Kerr et al. |
| 8,879,607 | B2 | 11/2014 | Skarp |
| 8,942,718 | B2 | 1/2015 | Svendsen |
| 9,225,370 | B2 | 12/2015 | Tazebay et al. |
| 9,229,089 | B2 | 1/2016 | Do et al. |
| 9,363,784 | B1 | 6/2016 | Friday et al. |
| 9,648,652 | B2 | 5/2017 | Granbery |
| 2002/0045424 | A1 | 4/2002 | Lee |
| 2004/0203566 | A1 | 10/2004 | Leung |
| 2004/0203880 | A1 | 10/2004 | Riley |
| 2005/0003827 | A1 | 1/2005 | Whelan |
| 2005/0136845 | A1 | 6/2005 | Masuoka et al. |
| 2005/0136981 | A1 | 6/2005 | Rensburg et al. |
| 2007/0073842 | A1 | 3/2007 | Uehara |
| 2007/0117568 | A1 | 5/2007 | Misikangas et al. |
| 2007/0121560 | A1 | 5/2007 | Edge |
| 2007/0280167 | A1 | 12/2007 | Olexa et al. |
| 2008/0002627 | A1 | 1/2008 | Cha et al. |
| 2009/0022078 | A1 | 1/2009 | Patterson et al. |
| 2009/0047973 | A1 | 2/2009 | MacNaughtan et al. |
| 2009/0311963 | A1* | 12/2009 | Haverty ............. H04K 3/226 455/63.1 |
| 2010/0087194 | A1 | 4/2010 | MacNaughtan et al. |
| 2010/0142365 | A1 | 6/2010 | Richardson et al. |
| 2010/0248640 | A1 | 9/2010 | MacNaughtan et al. |
| 2011/0110338 | A1 | 5/2011 | Khoryaev |
| 2011/0190004 | A1 | 8/2011 | Tenny et al. |
| 2011/0212720 | A1 | 9/2011 | Hamalainen et al. |
| 2011/0287801 | A1 | 11/2011 | Levin et al. |
| 2012/0026941 | A1 | 2/2012 | Ahmad et al. |
| 2012/0040602 | A1 | 2/2012 | Charland |
| 2012/0064881 | A1 | 3/2012 | Svendsen |
| 2013/0343283 | A1 | 12/2013 | Laroia et al. |
| 2014/0036787 | A1* | 2/2014 | Ganu ............... H04W 16/10 370/329 |
| 2014/0357196 | A1 | 12/2014 | Mayor et al. |
| 2015/0066802 | A1 | 3/2015 | Goulart et al. |
| 2015/0201306 | A1 | 7/2015 | Kazemi et al. |
| 2015/0249907 | A1 | 9/2015 | Gupta et al. |
| 2015/0334548 | A1* | 11/2015 | Liu ............... H04W 72/0473 370/329 |
| 2015/0373762 | A1 | 12/2015 | Raj et al. |
| 2016/0087765 | A1 | 3/2016 | Guey et al. |
| 2016/0119958 | A1 | 4/2016 | Tan et al. |
| 2016/0150357 | A1 | 5/2016 | Jung et al. |
| 2016/0306813 | A1 | 10/2016 | Meredith et al. |
| 2016/0323717 | A1 | 11/2016 | Friday et al. |
| 2016/0323754 | A1 | 11/2016 | Friday et al. |
| 2016/0323803 | A1 | 11/2016 | Friday et al. |

FOREIGN PATENT DOCUMENTS

| | | |
|---|---|---|
| WO | 2011106517 A1 | 9/2011 |
| WO | 2011106538 A1 | 9/2011 |

OTHER PUBLICATIONS

Notification of Transmittal of The International Search Report and The Written Opinion of The International Searching Authority or the Declaration, International Search Report and Written Opinion of the International Searching Authority from PCT/US2016/030328, dated Sep. 1, 2016 1-7 pages.

Notification of Transmittal of The International Search Report and The Written Opinion of The International Searching Authority or the Declaration, International Search Report and Written Opinion of the International Searching Authority from PCT/US2016/030326, dated Aug. 18, 2016 1-7 pages.

Notification of transmittal of the international search report and the written opinion of the international searching authority, or declaration including the Written Opinion of the International Searching Authority, International Search report, and Written Opinion from PCT/US 2017/036163, dated Sep. 14, 2017, pp. 1-8.

* cited by examiner

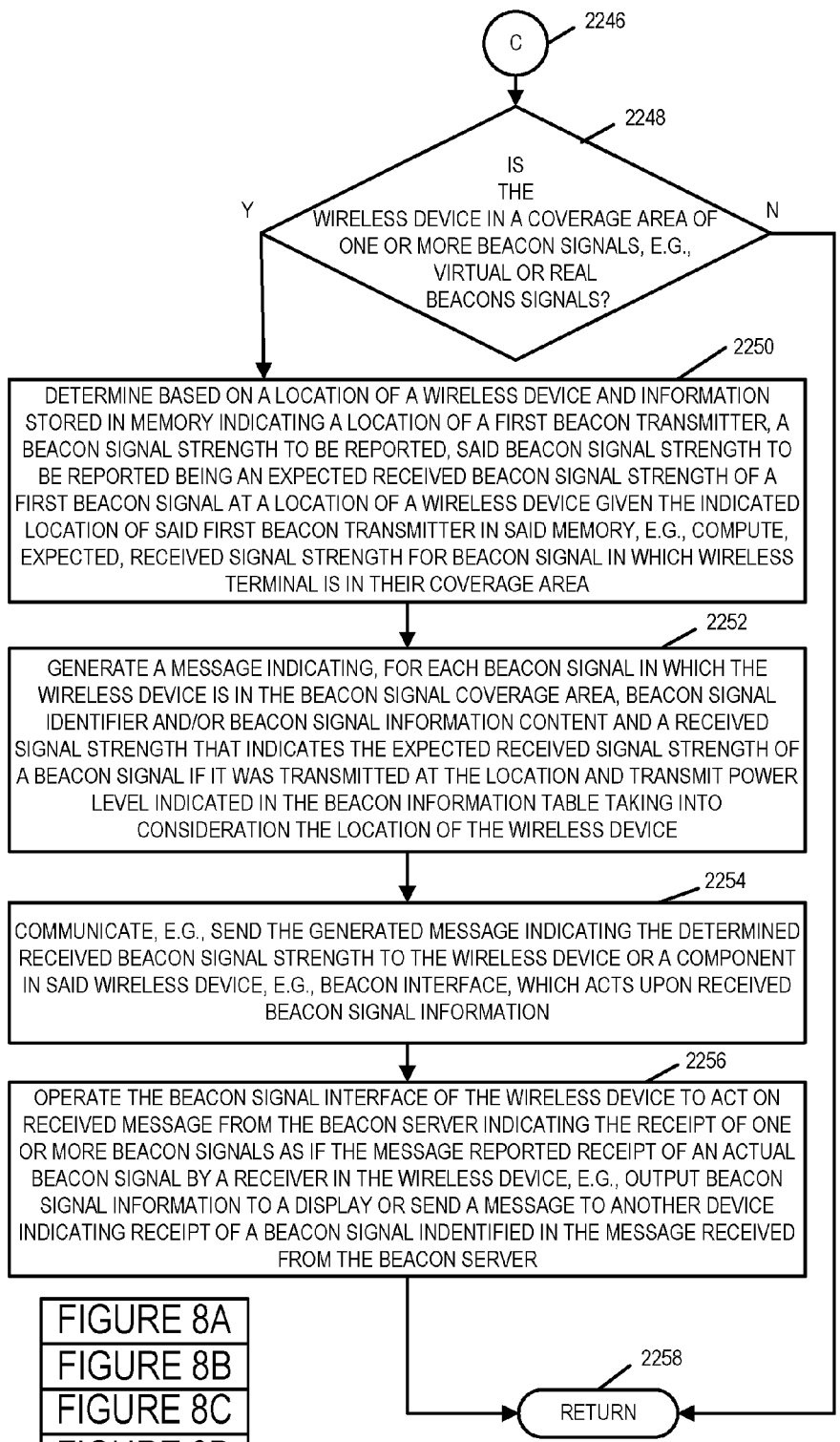

DYNAMIC VIRTUAL BEACON METHODS AND APPARATUS

RELATED APPLICATIONS

The present application claims the benefit of U.S. Provisional Patent Application Ser. No. 62/197,980 filed Jul. 28, 2015 and is a continuation-in-part of U.S. patent application Ser. No. 14/811,684 filed Jul. 28, 2015, is a continuation-in-part of U.S. patent application Ser. No. 14/811,689 filed Jul. 28, 2015 and is a continuation-in-part of U.S. patent application Ser. No. 14/850,725 filed Sep. 10, 2015 which claims the benefit of U.S. Provisional Patent Application Ser. No. 62/155,428 filed Apr. 30, 2015, each of the above identified patent applications is hereby expressly incorporated in its entirety.

FIELD

The present application relates to wireless beacons and, more particularly, to methods and apparatus for using real and/or virtual beacon signals.

BACKGROUND

Physical beacon transmitters are used to transmit signals which can be used to communicate identifiers and/or information. A device receiving a beacon signal can use the information in the received beacon signal for a variety of purposes.

In devices which receive beacon signals, receipt of a beacon signal may be reported to a module or application which then processes the beacon signal to obtain information and/or take some form of action. The received signal strength of the beacon signal may be reported to the application or module responsible for taking some action. Thus, devices, applications or modules which are designed to use beacon signals often include interfaces designed to receive and process received beacon signal information, e.g., information normally provided by a receiver or other device component which receives and/or processes a beacon signal and then provides at least some information about the received beacon signal to the beacon interface.

Given the growing use of beacon signals, many devices and/or applications are designed to take advantage of received beacon signals and the information reported in them.

It would be desirable if a wireless terminal could be able to take advantage of devices, modules or other components which are intended to provide information in regard to received beacon signals even when beacon signals are not in fact received and/or the device seeking information lacks the ability such as a wireless receiver, capable of receiving a transmitted beacon signal. It would also be desirable if an entity seeking to communicate information could take advantage of devices, modules or components intended to supply information in response to an indication that a beacon signal was received, without having to deploy an actual beacon transmitter in at least some cases.

Physical beacon signals may be transmitted by individual devices such as wireless access points, base stations, etc. The placement, moves and maintenance of physical beacon transmitters can be costly to deploy, expensive to maintain and in the case of at least some transmitters, difficult to move. In addition it can be difficult to change the transmit power and/or other physical characteristics of a physical transmitter given that some changes might require physical movement and/or changes to a beacon transmitter.

In view of the above discussion, it should be appreciated that there is a need for methods and/or apparatus which allow devices to communicate or receive information as if a beacon signal were transmitted and/or received even when a beacon signal is not actually transmitted or received. It should be appreciated that there is a need for methods and/or apparatus which would allow a device's ability to process and use beacon signal information without one or more of the problems associated with maintaining, moving and/or modifying physical beacon transmitters.

SUMMARY OF THE INVENTION

Methods and apparatus for communicating and/or obtaining information are described. The methods and apparatus support the use of what are called virtual beacon transmitters and virtual beacon signals. Virtual beacons are virtual in that an actual beacon signal need not be, and in many cases are not, transmitted. A message indicating receipt of a beacon signal will be generated when a device is within range of a virtual beacon transmitter.

In various embodiments a virtual beacon transmitter is implemented as a dynamic device whose location, transmission power and/or other transmitter characteristics can be changed as a function of a schedule, a location of a mobile device, location of a group of people or devices and/or one or more other factors.

A virtual beacon transmitter in some embodiments is implemented by storing virtual beacon transmitter information such as a transmitter location, transmit power level, and/or information to be communicated by the beacon signal such as a beacon signal ID. In some but not necessarily all embodiments the beacon signal ID can be used to access a database mapping individual beacon IDs to information. Alternatively information or messages can be communicated directly in a beacon message and in such cases the message reporting the receipt of a beacon signal, e.g., a virtual beacon signal, would include the information that was to be carried in the virtual beacon signal. Thus virtual beacons like real beacon signals can be used to directly communicate information, e.g., messages, or indirectly communicate information via the mapping of the beacon ID or other value to information in a database.

In the case of virtual beacons, one or more devices report actual signals that they have received and/or location information to a device, e.g., beacon server, which receives information communicating a wireless terminal's location and/or information such as received signals from which the wireless terminal's location can be determined. The beacon server determines from the received signal information, e.g., via use of a location determination device, the wireless terminal's location. The location of the wireless terminal contacting the beacon server is then compared, e.g., by the beacon server, to transmission coverage areas of virtual beacon transmitters and/or physical beacon transmitters in the beacon server's database of beacon transmitters.

The beacon server determines which beacon transmitters, if any, cover the location of the wireless terminal. For one or more of the beacon transmitters in whose coverage area the wireless terminal is located, a message indicating receipt of a beacon signal from the virtual or real transmitter is generated and communicated to a beacon signal interface in the wireless terminal. The message sent to the beacon signal interface may, and sometimes does, include an indication of a received beacon signal strength and an information which is indicated as being received in the beacon signal whose receipt is being reported by the message. In this way the beacon server generates a beacon signal receipt message for a beacon signal which, in the case of a virtual beacon transmitter, was never actually transmitted.

The beacon signal interface of the wireless terminal or other device receiving the beacon signal message processes the message as if it corresponded to an actually received beacon signal. In this way the beacon signal interface which may, and sometimes does, also process messages corresponding to actually received beacon signals, can process a beacon signal message without regard to whether or not the message relates to an actually received beacon signal or a virtual beacon signal.

The information about virtual beacon signal transmitters in the beacon signal server can be easily updated, e.g., by simply changing transmitter location information, transmit power level information and/or other information.

In some embodiments, virtual beacon transmitter location, power level and/or other information used by a beacon server to determine whether a device is in a real or virtual beacon signal coverage area are dynamically updated, e.g., based on a variety of different types of information. In some embodiments the update is based one or more inputs, such as location information indicating the current location of a device or group of devices and/or a schedule. The input used to control updating of virtual beacon information is, in some embodiments, a schedule which indicates different beacon transmitter locations, different beacon transmitter power levels and/or different beacon signal information for different times of day, days and/or dates. Thus the location, transmit power level and/or information which is indicated as being transmitted by a particular beacon transmitter may and sometimes is varied as a function of a schedule and can thus be a function of time.

In some cases one or more aspects of the beacon transmitter information can be dynamically changed to reflect changes in an environment, changes in the location of a device or person and/or information about traffic or a group, e.g., of people or devices. By dynamically changing the location information corresponding to a virtual beacon transmitter, as done in some embodiments, based on the location of traffic, a device or person, or group, the virtual beacon transmitter will appear to move with the traffic, device, person or group. As the location information of the beacon transmitter is dynamically changed the corresponding beacon transmission coverage area will change. Thus the beacon server, as it determines what messages to send, will use the beacon transmitter in effect at the time a decision is being made to indicate which if any beacon signals were received and the power level of the received beacon signal to be reported in a beacon signal message.

The location information of a person, device, or group may be, and sometimes is, updated based on location determinations made using reported signal information. For example, as the beacon server receives information indicating the receipt of a signal or signals by a device, e.g., real world radio frequency signals, or a device reports its location, the location of the reporting device is determined and device location information is updated to indicate the devices current location. If a virtual beacon signal transmitter is associated with the device the location of the corresponding virtual beacon transmitter is updated when a change in the device's location is detected. The location of a group can be, and sometimes is, determined based on the location of multiple devices which correspond to the group.

The location of a person, e.g., as indicated or determined from the location of a device corresponding to the person, is in some embodiments set to correspond to a location of a device used by the person, e.g., a cell phone.

While a device may report signals it receives and/or its location, it should be appreciated that devices such as access points can report signals received from devices along with information sufficient to identify the devices. In such cases the location of the devices is updated based on the report of the receipt of signals from the devices.

Regardless of how a device's location is determined and/or the location of a group of devices is determined, location information indicating the location of the device, group, or corresponding person is updated and used to update the location of a virtual beacon transmitter corresponding to the device group or person. In this way, the location of the virtual beacon transmitter moves with the corresponding person, device or group over time in some embodiments.

In addition to or as an alternative to dynamically altering the location of the virtual beacon transmitter by altering the stored transmitter location information to be used during a period of time, the transmit power level of the virtual beacon transmitter can be changed based on one or more factors such as the size of a group, physical distribution of a group and/or rate of motion of the group. For example, in the case of a crowd whose members can be detected because of reports of received signals from devices of individuals in the crowd, the physical size of the crowd and the geographic area covered by the crowd can be determined. Based on the crowed location, the location of a virtual beacon transmitter can be placed to coincide with the location of the crowd, e.g., at the center of the crowd, and the indicated transmit power of the beacon transmitter can be, and sometimes is, set so that the crowd will be considered within the coverage area, e.g., virtual transmission range, of the virtual beacon transmitter. As the area occupied by the crowd expands, the stored beacon transmission power information can be increased and as the size of the area covered by the crowd is detected to decrease the virtual beacon transmitter power can be changed, e.g., decreased, to reduce the coverage area of the virtual beacon transmitter corresponding to the crowed.

Users of a system or device which uses virtual beacons can set up information for multiple virtual beacons associated with different things. For example a wireless terminal owner may configure a virtual beacon transmitter to coincide to the location of his/her mobile wireless terminal, e.g., cell phone and/or blue tooth capable device. As the mobile wireless terminal changes location, the location of the virtual beacon transmitter corresponding to the wireless terminal will be updated to match the location of the wireless terminal. In this way the virtual wireless terminal acts as a moving beacon transmitter with the location of the virtual beacon transmitter changing over time as the mobile wireless terminal moves and changes location. In such a case other devices which are determined to be within the coverage area of the virtual beacon signal transmitter corresponding to the mobile wireless terminal will be notified by the beacon server that they received beacon signals from the beacon transmitter associated with the wireless terminal when they are in the coverage area of the virtual beacon transmitter corresponding to the mobile wireless terminal even though no beacon signals may have been actually transmitted by the mobile wireless terminal to which the virtual beacon transmitter corresponds. In this way, a virtual beacon transmitter can act as if it were a physical transmitter transmitting from the location of the mobile wireless terminal to which the virtual beacon transmitter corresponds. Similarly a virtual beacon transmitter can be associated with a group of devices and change its location and/or transmit power level as the group moves and/or changes in terms of the size of the geographic area in which the group is located.

It should be appreciated that virtual beacons can and sometimes are dynamically changed by altering stored beacon transmitter information based on a promotion or other schedule. For example, a store or goods promotion may schedule the location of a virtual beacon transmitter to change based on an advertising schedule. In such a way a virtual beacon transmitter used to indicate, for example, a blue light sale special, can be moved over a period of time based on a schedule simply by altering the location information that is stored for the virtual beacon transmitter used to provide information about the blue light special.

Changes to virtual beacon transmitter information, e.g., location changes, alone or in combination with a schedule can be used to support treasure hunts and/or other promotions where it may be desirable to change the location of a beacon transmitter so that devices receive messages indicating detection of beacon signals or determine the receipt of a virtual beacon signal, e.g., at locations where an actual beacon signal transmitter may not be easily placed and/or altering the signals transmitted by a physical transmitter might be difficult to implement for legal or transmitter ownership reasons.

As should be appreciated, vehicle or pedestrian traffic can be viewed as a case of a group wherein the group may move over time. A virtual beacon can be changed to give the effect of a beacon transmitter moving with the traffic whether it be vehicular traffic or pedestrian traffic.

The change in virtual beacon transmitter location and/or the size of the coverage area can be, and in some embodiments are, implemented by simple changes in the information associated with a virtual beacon transmitter without the need to modify a physical transmitter. Thus it should be appreciated that virtual beacon related methods and apparatus of the present invention allow for a virtual beacon transmitter to be dynamically changed without the need for changes to an actual physical transmitter.

Devices which store or have access to the virtual beacon information can determine based on the location of a wireless terminal whether the wireless terminal is within the coverage area of a virtual beacon and the signal strength of the virtual beacon signal that would have been received by the wireless terminal if a real beacon signal had been transmitted by the virtual beacon transmitter. The wireless terminal's distance to the virtual beacon transmitter may also be determined along with the direction of the wireless terminal relative to the beacon transmitter. In embodiments where the wireless terminal determines the receipt of a virtual beacon signal it uses the information internally, e.g., by providing the information indicating the receipt of a beacon signal, e.g., a virtual beacon signal, to a device or component within or external to the wireless terminal which processes information indicating the receipt of a beacon signal and takes an action, e.g., generates an audible, visual, or some form of perceivable alert, displays a message or takes some other physical action based on the information indicating the receipt of a real or virtual beacon signal.

In cases where a network node is the device that determines that a wireless terminal is to be treated as having received a virtual beacon signal, the network node sends a message to the wireless terminal or another device that uses received beacon signal information indicating that the wireless terminal received a beacon signal, e.g., a virtual beacon signal. The wireless terminal then uses the information in the received message and reports to a device or component in the wireless terminal that a beacon signal of the type and strength indicated in the received message was received when in fact it was the message reporting a virtual beacon signal rather than an actual beacon signal that was received. Messages reporting receipt of a virtual beacon signal may, and in some embodiments do, indicate distance, in addition to received signal strength, to the virtual beacon transmitter and optionally also direction to the virtual beacon transmitter.

A network device external to the wireless terminal or a component of the wireless terminal which receives a message indicating receipt of a beacon signal supplies information in response to such a message or takes an action on the received beacon signal information whether a receipt of a real or virtual beacon signal is being reported. In this way, the same device or circuit which responds to messages or signals regarding actual received beacons can respond to messages reporting the receipt of a virtual beacon signal as if it were an actual beacon signal. In fact, the device which provides information in response to messages reporting received beacon signals need not know that the beacon information it is being supplied with corresponds to a virtual beacon signal or that a beacon signal being reported as being received is a virtual beacon signal. While the reports of receiving a beacon signal are not actually true in the case of virtual beacon signals the device or component within the wireless terminal acting on the report of a received beacon signal need not know this. By miss-representing to the device that takes actions based on received beacon signals, a wireless terminal can obtain information using messages of the same format which would be used if an actual beacon signal was received and corresponding information was being sought. While virtual beacon identifiers and corresponding information may be included in an information database with no distinction between information corresponding to actual beacon signals and virtual beacon signals, in some embodiments messages reporting the receipt of virtual beacon signals may include additional information beyond that normally included in messages communicating the receipt of actual beacon signals. For example information on the reporting device's angle, direction, or distance relative to the virtual beacon transmitter may be reported in a message reporting receipt of a virtual beacon signal in addition to beacon signal strength information and/or information indicating a time of receipt of the virtual beacon signal in addition to received beacon signal power level. In the case of a message reporting receipt of a virtual beacon signal the reported time of signal receipt is the time at which the wireless terminal was at the location on which the received signal strength report was based. Thus, the reported signal strength in a message reporting receipt of a virtual beacon corresponds to the wireless terminal's estimate of the strength of beacon that would have been received if transmitted by the virtual transmitter at the time indicated in the message reporting receipt of the virtual beacon signal given the wireless terminal's actual location at the indicated time and specified location of the virtual beacon transmitter.

Thus it should be appreciated that receipt of a virtual beacon based on wireless terminal location and virtual beacon transmitter characteristics can be determined either in a network element outside the wireless terminal or in the wireless terminal depending on the particular embodiment and that the information indicating the virtual beacon transmitter characteristics can be altered based on a schedule, received information and/or group, person or device location information.

For each of one or more virtual beacon signal transmitters, a wireless terminal or network device responsible for determining receipt of a virtual beacon signal by a wireless terminal stores the location of the beacon transmitter, the transmit power level of the beacon transmitter, the information and/or beacon identifier communicated by the virtual beacon signal. Additional information may include the type of beacon signal and/or the frequency band allegedly used to transmit the virtual beacon transmitter.

In some embodiments the wireless terminal includes a location determination device or module such a GPS receiver or location determination circuit which may operate on received signals whether the received signals be GPS signals, beacon signals or other signals. Thus, in various embodiments the wireless terminal may determine its location in any of a variety of different ways. Wireless terminal location determination is in some embodiments performed by a network device, e.g., based on signals received from the wireless terminal or based on information received from other devices. The determined wireless terminal location information whether it be determined in the wireless terminal or network device is communicated to the device or component of the wireless terminal or network for determining whether a wireless terminal has received a virtual beacon signal. Based on its determined location at a given time, the wireless terminal or network device which supports virtual beacon signal receipt determinations, determines, based on stored information, if a wireless terminal is in the transmission range of a virtual beacon transmitter. If the device responsible for determining receipt of virtual beacon signals determines that a wireless terminal is in the range of a virtual beacon transmitter the determination device determines based on the location of the wireless terminal, the transmit power level of the virtual beacon and the location of the beacon transmitter a received signal strength which is the strength of a beacon signal that would have been received by the wireless terminal if the virtual transmitter had in fact transmitted a beacon signal at the transmit power level of the virtual beacon signal. The determination device may, and in some embodiments does, use a path loss model that takes into consideration distance in determining the received signal strength corresponding to the virtual beacon signal.

Once a received signal strength has been computed, the virtual beacon receipt determination device in some embodiments proceeds to generate a received beacon signal reporting message, e.g., signal, reporting the receipt of a virtual beacon signal. The reporting message includes, in some embodiments, an identifier identifying the wireless terminal or other device reporting receipt of the virtual beacon signal, the determined received signal strength of the virtual beacon signal, a beacon signal identifier identifying the received beacon signal and/or other content which was to be communicated by the virtual beacon signal if it had been transmitted as an actual beacon signal. The beacon signal reporting message may have the same form and content of a beacon signal reporting message used to report receipt of a real beacon signal but itself is not a beacon signal. For example, a cellular message may be sent to a wireless terminal indicating receipt of a virtual WiFi beacon signal or a WiFi data signal which is not a beacon signal may be sent to the wireless terminal indicating that the wireless terminal should act as if it received a WiFi beacon signal having the content and received power level indicated in the communicated message. In such cases, the virtual beacon reception determination device, in sending the message reporting the receipt of the virtual beacon signal, is intentionally providing false information since no such beacon signal was actually received. This miss-representation allows the device receiving the message to act on the reported receipt of a beacon signal and obtain information from a device or module, e.g., a network device or a module on the wireless terminal, using the same interface and messaging used to obtain information used when actual beacon signals are received and are to be acted upon.

While the same message format and content may be used for reporting the receipt of actual received beacon signals and virtual beacon signals, in some embodiments virtual beacon signal reporting messages include more information than messages communicating the receipt of actual beacon signals. The virtual beacon signal reporting message includes, in some embodiments, information indicating the wireless terminal's position relative to the position of the virtual beacon transmitter. The position may be an angle to the virtual transmitter, direction and/or distance to the virtual beacon transmitter.

It should be appreciated that virtual beacon transmitters, by their virtual nature, allow beacons to be moved and changed without touching an actual physical beacon. Thus virtual beacon transmitter power can use transmission power levels which exceed transmission power levels allowed by regulations in a given area but, given the virtual nature of the beacon signals are allowable since the power levels do not correspond to actual transmissions. In addition virtual beacon transmitters can be positioned at locations where it might not be possible or desirable to deploy actual beacon transmitters. As a result of the wide range of locations, power levels, frequency bands and/or other characteristics that can be configured for a virtual beacon signal and virtual beacon transmitter, virtual beacon signals can cover geographic regions and/or zones which might not be possible to cover with an actual beacon transmitter. For example, a virtual beacon transmitter might be indicated as being positioned at the center of a city at a vertical position 5000 feet high with a transmit power level that would result in a beacon transmission covering the entire city. While a physical transmitter with such characteristics might not be physically or legally possible the methods and apparatus of the present invention allow for such a virtual beacon transmitter and for wireless terminals to report the receipt of beacon signals from such a virtual beacon transmitter based on their location and information about the virtual beacon transmitter.

Numerous additional features, benefits and embodiments are discussed in the detailed description which follows.

BRIEF DESCRIPTION OF THE FIGURES

FIG. 8 illustrates an exemplary method of using beacon signal information, e.g., virtual and/or real beacon signal information, to generate messages which can be communicated to and used by a beacon interface of a user equipment device, e.g., wireless terminal

FIG. 8D is a fourth part of FIG. 8 which shows an exemplary method.

DETAILED DESCRIPTION

Figure 1:
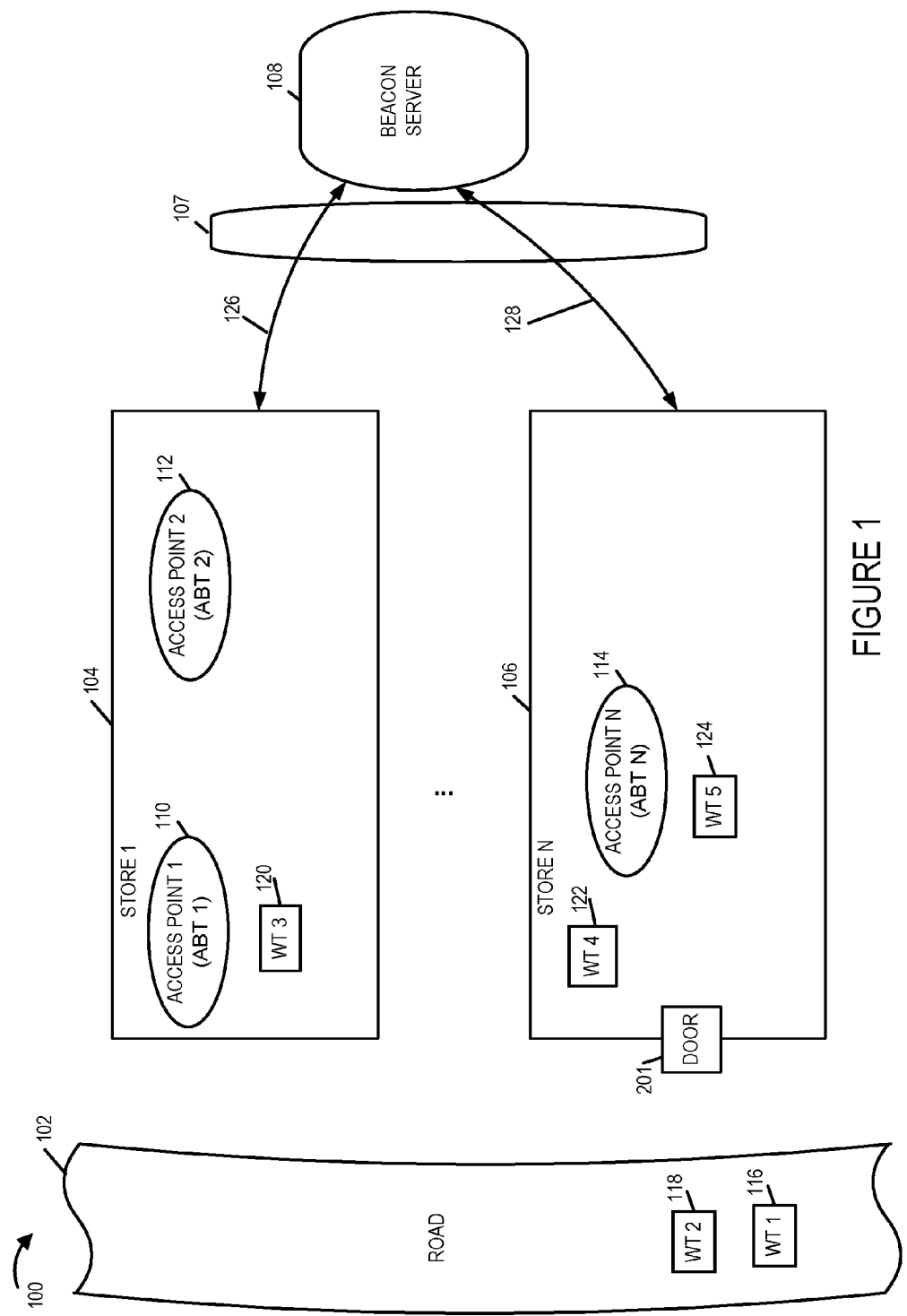
FIG. 1 is a drawing of an exemplary system and exemplary environment in accordance with one exemplary embodiment.

FIG. 1 is a drawing of an exemplary system and exemplary environment in accordance with one exemplary embodiment. FIG. 1 shows an environment 100 which includes a road 102 and multiple stores including a first store 104 and a Nth store 106. The environment 100 includes various user devices, e.g., wireless terminal (WT) 1 116 and WT 2 118 on the road 102. The wireless terminals may be cell phones or other wireless devices of individuals in separate cars traveling on the road 102. Adjacent the road are store 1 104 and store N 106. Additional stores represented by the three dots may be located along the road.

The first and Nth stores 104, 106 include access points 110, 112 and 114 which transmit beacon signals that can be detected by wireless terminals 120, 122, 124 in the stores and/or WT 1 116 and WT 2 118 passing along the road when they are within the transmission range of the access points. For example, wireless terminal WT3 120 in store 1 104 is within range of access point 1 110, also identified as actual beacon transmitter 1 (ABT 1) and within range of access point 2 (ABT 2) 112. From the signals and received signal strengths of the signals received by WT 3 120, it is possible for WT 3 120 or another device such as beacon server 108 to determine the location of WT 3 120 with respect to the known location of access point 1110 and access point 2 112. This is particularly useful since within a store, wireless terminal WT 3 120 may be unable to receive GPS signals since they may be blocked by the building structure of store 1 104.

In store N 106 wireless terminals WT 4 122 and WT 5 124 receive beacon signals from access point N 114 (ABT N). While one or a few access points/actual beacon transmitters are shown in each of the stores 104, 106 by including several access points or an array of access points, signals transmitted by the access points can be used to determine the location of a wireless terminal within a store with a good degree of accuracy. Similarly by monitoring signals transmitted by wireless terminals, information of the received signal strength measured at the access points can be used to determine the wireless terminals within the range of access points and the location of such terminals with good accuracy.

Thus, within stores 104, 106 transmitted signals are received, the signal strengths measured, and the transmitting device identified by the receiving device. Based on the received signal identifiers and strength measurements, and known location of access points in the environment, locations of one or more wireless terminals is determined in the environment in some embodiments. The location determination operations can be done internally in the wireless terminals or in a network device, e.g., network based beacon server 108, after the beacon server 108 is provided with received signal information.

Wireless terminals outside of buildings such as WT 1 226 and WT 2 118 receive signals, e.g., GPS and/or beacon signals from which they can determine their location. Devices which determine their location can report their location to a beacon server included inside the wireless terminal or in the network, e.g., beacon server 108. Wireless links and signals can be used to connect the wireless terminals via access points or via a base station, e.g., a cellular base station, to network based beacon server 108. Links 126 and 128 represent wireless links or other network connections to the beacon server 108 between the access points 110, 112 and 114. The links are part of a wireless or wired network 107. The network 107 maybe a cellular network. Wireless terminals can send and receive wireless messages via the access points in the stores 104, 106 and thus send and/or receive messages from the network based beacon server 108. Store 106 includes a door 201 and access point N 114.

Wireless terminals 116, 118 also have wireless network connectivity, e.g., cellular network connectivity, to beacon server 108 and thus can receive messages from and send messages to the beacon server 108 via network interfaces included in the terminals 116, 118.

Figure 2:
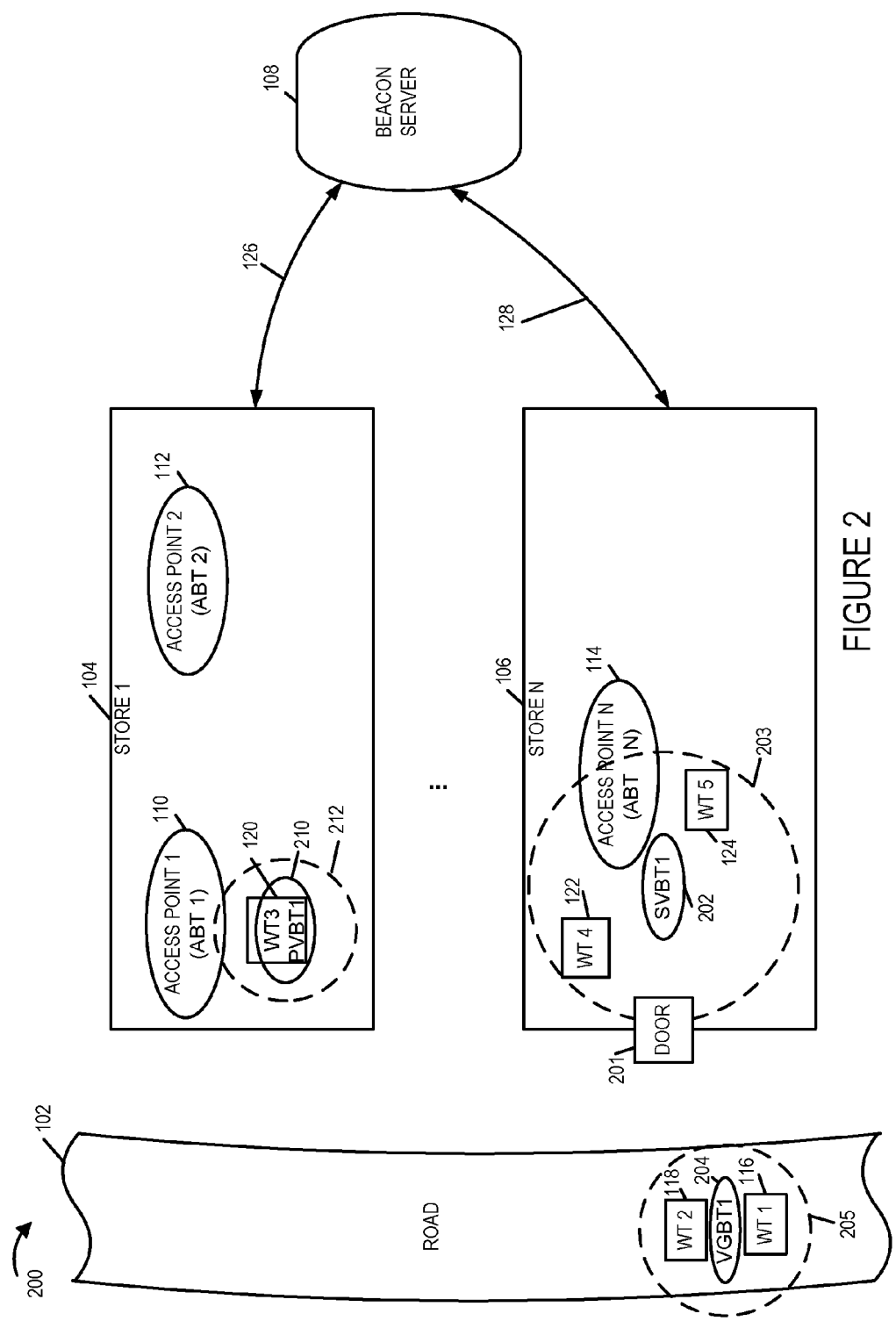
FIG. 2 illustrates the exemplary system and exemplary environment of FIG. 1 at a first point in time during which virtual beacon transmitters are supported.

In FIG. 1 the various wireless terminals (116, 118, 120, 122, 124) are shown at locations at a particular point in time, T1. Over time the WTs may move and thus their location may change. FIG. 2 is a diagram 200 showing the environment shown in FIG. 1 at time T1 but with virtual beacon transmitters shown and the corresponding coverage areas of the virtual beacon transmitters shown using dashed lines.

Virtual beacon transmitters are not real beacon transmitters but rather a set of beacon transmitter information which is used to control beacon signal messages that may be sent by a beacon signal server to a beacon signal interface of a device to report the receipt of a beacon signal which is not actually received by a device. The transmit power level and location of virtual beacon transmitters can be changed by simply altering beacon signal power level and transmitter location information in a beacon signal information table that is used by a beacon server 108 or one which is included in a WT, to determine based on device location if a message should be sent to the device's beacon signal interface reporting receipt of a beacon signal. The beacon signal interface may be, and sometimes is, used as an interface to other modules, components and/or applications in a wireless terminal that use received beacon signal information, including a received beacon signal ID and received signal power level, to control one or more physical actions such as the display of alerts, sending of messages or other actions based on the receipt of one or more received beacon signals. The same beacon interface to which virtual beacon signal messages are sent can receive messages from a receiver in the wireless terminal reporting the receipt of an actual beacon signal by a wireless interface in the wireless terminal. From the beacon interface perspective, the report of receiving a virtual beacon signal and the report indicating the receipt of an actual beacon signal can be treated the same with, in some cases, the actions taken in response to the report of the virtual or real beacon signal being the same. In fact, the beacon interface need not, and in some embodiments is not, notified of whether the reported received beacon signal is a real or virtual beacon signal.

Virtual beacon signals can be of a variety of types and the beacon signal transmitter location of the different types of virtual beacon signals can change, e.g., in a dynamic manner over time. For example, a personal virtual beacon transmitter can be associated with the device of a person and the location of the personal virtual beacon transmitter will be updated to move, e.g., change, as the location of the device associated with the personal virtual beacon transmitter changes over time. A virtual beacon transmitter can be associated with a group and move as the devices in the group move. In addition the transmit power of the virtual group beacon transmitter can change to make sure that the transmit power results in a beacon coverage area which will cover all the members of the group. Thus as a group of devices corresponding to a virtual group beacon signal gets more spread out, the transmit power level indicated for the group beacon signal can be indicated to be an increased power level sufficient to cover the larger area. Similarly if a group of devices comes closer together, the power level of the virtual group beacon signal corresponding to the devices can be decreased so that the group is still covered but not other areas. Since no beacon signal is actually transmitted the transmit power level of the virtual beacon signal can be increased beyond that would be permitted for a real beacon signal transmitter allowing a group beacon signal to correspond to a larger geographic area than a physical beacon signal could cover due to actual real world power transmission constraints. Note that the signals/messages reporting a wireless terminals location or received signal information that are communicated to the beacon server 108 can be communicated over a cellular or other network than the network or frequency band to which the virtual beacon signals purportedly correspond. Similarly the messages from beacon server 108 indicating, e.g., reporting, receipt of a beacon signal or signals to the beacon signal interface of the wireless terminals can be sent over the cellular or other wireless network and are thus not constrained by what the range of the beacon signals themselves might be if they were physically transmitted by a beacon transmitter at the indicated location of the virtual beacon transmitter.

Figure 3:
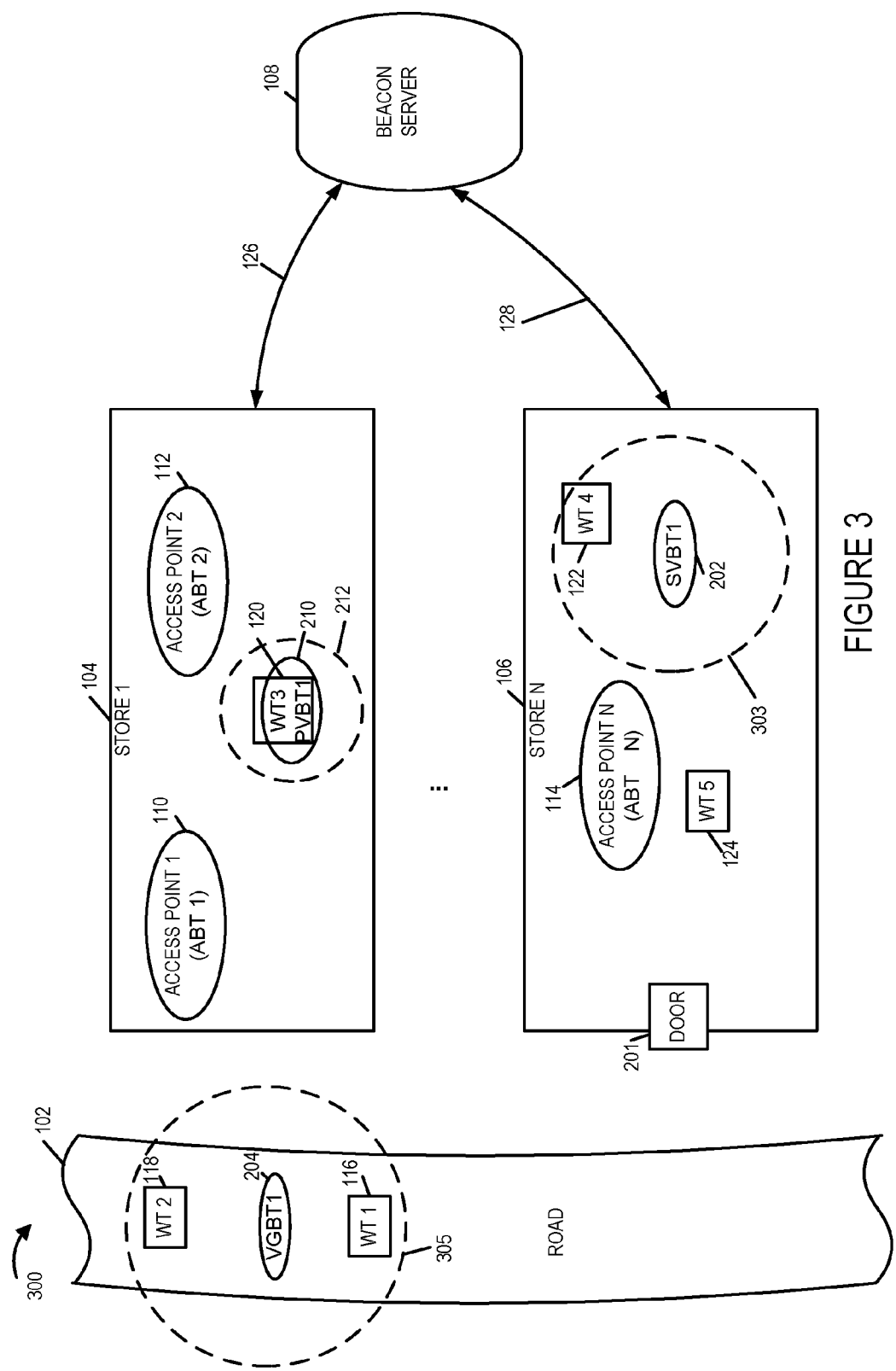
FIG. 3 illustrates the exemplary system and exemplary environment of the system shown in FIGS. 1 and 2 at a second point in time following the first point in time corresponding to FIG. 2.

While FIG. 2 illustrates the exemplary system and exemplary environment of FIG. 1 at a first time T1 during which virtual beacon transmitters are supported, FIG. 3 is a diagram 300 showing the same environment at a second time T2 which follows the time T1 corresponding to FIG. 2. The differences between FIGS. 2 and 3 are useful in explaining some of the features of personal, group, and scheduled virtual beacon signals and how such signals and the corresponding beacon transmitter information can change over time.

In FIG. 2 a private virtual beacon transmitter (PVBT1) 210 is associated with WT 3 120 and will move with WT 3 120, with the beacon server 108 updating the location of the PVBT1 210 to match the location of WT 3 120 as changes in the location of WT 3 120 are made known to the beacon server 108. Note that in FIG. 3 which corresponds to a later time than the time to which FIG. 2 corresponds, the location of the PVBT1 210 has been changed to match that of the WT3 120 and reflects the change in the location of WT 3 120 between time T1 corresponding to FIG. 2 and time T2 corresponding to FIG. 3.

In FIG. 2, WT1 116 and WT 2 118 correspond to a first group of devices associated in a beacon information table with virtual group beacon signal transmitter (VGBT) VGBT1 204. The location of VGBT1 204 is determined by beacon server 108 to be at a center or near the center of the group of devices WT1 116 and WT2 118 and to have a transmission power level sufficient to achieve a virtual group beacon signal 1 coverage area 205 which covers both the devices WT 1 116 and WT 2 118 in the first group. Virtual beacon signal information may be dynamically changed based on changes in the location of one or more devices. Consider for example that in FIG. 3 the location of the VGBT 1 204 transmitter has not only been changed based on the new location at time T2 of the devices, WT 1 116 and WT 2 118, in the first group, but also the virtual transmission power associated with VGBT1 204 has been increased since the devices in the first group are further apart at time T2 with the increased transmission power resulting in the larger VGBT1 transmission coverage area 305. In some embodiments the new virtual transmission power exceeds that permitted by regulation for an actual transmitted beacon signal. The changes in location and transmit power level for the group is implemented by simply updating stored virtual beacon information for the group.

Changes in virtual beacon signals can also be based on a schedule. For example, one or more virtual beacon signals may be scheduled to change location over time based on expected traffic patterns and/or to encourage traffic in a particular direction. For example a schedule may be used to move the location of a scheduled virtual beacon transmitter from a location near a door 201 at the time the store 106 opens to further inside the store 106 later in the day to encourage customers to mover further into the store 106. Consider for example scheduled virtual beacon transmitter (SVBT) SVBT 1 202 shown near the door 201 with coverage area 203 at time T1 as shown in FIG. 2 and located further inside the store 106 with coverage area 303 at time T2 as shown in FIG. 3. The power of the scheduled beacon transmitter 1, as well as the location can, and sometimes is changed in accordance with a schedule as represented by the coverage area 303 being smaller than the coverage area 203 which corresponds to a higher virtual transmit power level at T1 than T2 for SVBT 1 202.

While messages from the beacon server 108 can be used to report the receipt of virtual beacon signals they can be, and sometimes are, used to report the receipt of actual transmitted beacon signals which were not or could not be received by a wireless terminal, e.g. because the wireless terminal did not include a receiver for receiving a beacon signal of the type which was transmitted. Consider for example that receipt of a Bluetooth beacon may be reported to a cellular device which includes a cellular network interface but not a Bluetooth interface. Thus in some embodiments beacon transmitter information which is stored in the beacon server 108 includes information for actual beacon signal transmitters as well as virtual beacon signals transmitters. Information stored by server 108 for beacon signals will be explained in more detail with reference to FIGS. 6 and 7.

Figure 4:
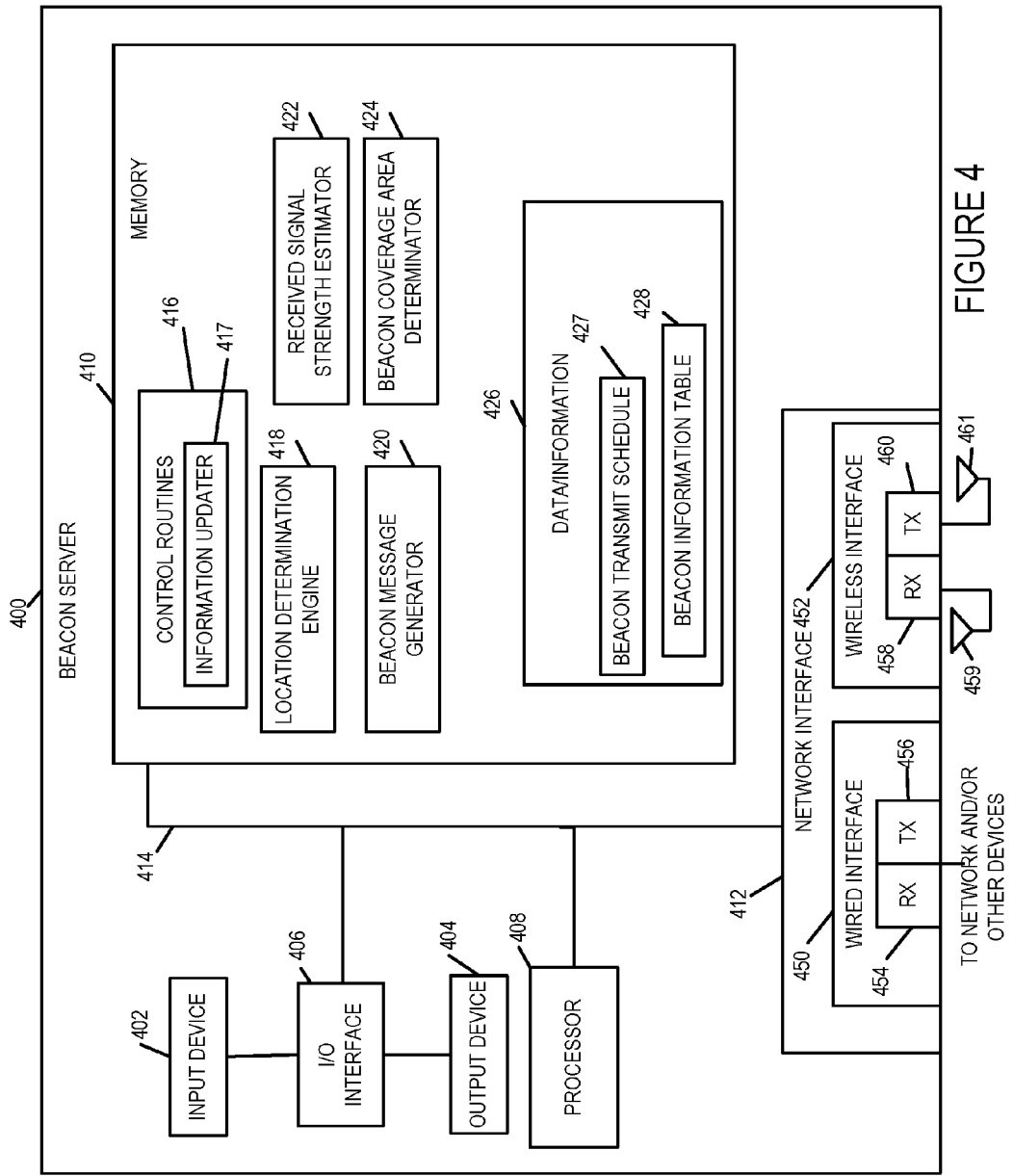
FIG. 4 shows an exemplary beacon server which supports virtual beacon transmitters and messages relating to virtual beacon signals in accordance with the exemplary embodiment.

FIG. 4 illustrates an exemplary beacon server 400 implemented in some embodiments. The beacon server 400 can be and sometimes is implemented as a network device while in other embodiments the beacon sever 400 is located internal to a user device, e.g., a wireless terminal, allowing a user device to generate its own beacon signal notification messages to supply to its beacon interface when the user device is able to determine its location. The beacon server 400 can serve as the beacon server 108 of FIGS. 1 to 3 or as the beacon server 516 of the wireless terminal 500 shown in FIG. 5.

The beacon server 400 includes an input device 402, e.g., keyboard, an I/O interface 406 for coupling the input device 402 and an output device 404 which may be a display, to a bus 414 which connects these components to the other components of the server 400 including memory 410, processor 408 and network interface 412. Network interface 412 can, and sometimes does, include a wireless interface 452 and a wired interface 450. The wireless interface 452 includes a wireless transmitter 460 coupled to a transmit antenna 461 and a wireless receiver 458 coupled to a receive antenna 459 while the wired interface 450 includes a wired transmitter 456 and a wired receiver 454. Via network interface 412 the beacon server 400 can communicate to wireless terminals when implemented as a network device and/or to other components within a wireless terminal when the beacon server 400 is implemented as part of a wireless terminal.

The memory 410 includes control routines 416 for controlling the beacon server to operate in accordance with the invention. The memory 410 also includes a beacon message generator 420 which is responsible for processing received signals and generating beacon signal messages communicating receipt of a beacon signal along with a received signal power level to a wireless terminal for which location information is received.

Wireless terminal location information received by the beacon server 400 may be in the form of received signal information, e.g., information reporting a signal such as a beacon signal from another device and the received signal strength, sent by a wireless terminal to the beacon server 400 or from an access point to the server 400. In some cases the wireless terminal may communicate its own determined location rather than received signal information. For example the wireless terminals WT1 116 and WT2 118 will report their GPS determined location rather than received signal information as location information while the wireless terminals ((WT 3 120, (WT4 122, WT 5 124)) in the stores (104, 106) will report the beacon signals they receive from the access points ((110, 112), 114 in the stores (104, 106) along with received signal strength information.

In response to receiving location information the beacon message generator 420 will attempt to generate a beacon signal message indicating receipt of one or more real or virtual beacon signals based on the location of the wireless terminal to which received location information corresponds and the known coverage area of the beacon signals for which information is stored in the beacon information table 428 included within data information 426 which may also include a beacon transmission schedule 427 for one or more virtual beacons with the transmit time, beacon transmitter location and transmit power as well as the information to be transmitted for a beacon signal indicated in the schedule 427.

If the location information received in a message relating to a wireless terminal does not include the actual location of the wireless terminal, the beacon message generator 420 calls the location determination engine 418 for location determination and provides the received signal information, relating to the wireless terminal whose location is to be determined, to the location determination engine 418. The location determination engine 418 determines the location of a wireless terminal based on signals which were reported as being received by the wireless terminal and/or based on signals reported by other devices which were transmitted by the wireless terminals and reported as being received by the other devices, e.g., access terminals, at known locations. The location determination engine 418 uses received signal strength information along with path loss information to determine the wireless terminal's location based on the known location of devices which transmitted signals to and/or received signals from the wireless terminal and the strength of the signals at time of receipt. The determined location of the wireless terminal is then reported to the beacon message generator 420.

The beacon message generator 420 then provides the determined wireless terminal location to the beacon coverage area determinator 424 which determines which beacon signals have coverage areas that include the determined wireless terminal location whether the location being a location that was determined by the wireless terminal and communicated to the server 400 or determined by the location determination engine 418.

For each beacon signal that is identified as covering the area in which the wireless terminal is located, the beacon message generator 420 consults the received signal strength estimator 422 and obtains a received signal strength value indicating what the strength of the virtual or real beacon signal would be received at the location of the wireless terminal if the signal was transmitted at the power level indicated in the beacon information table 428 for the particular beacon signal for which the received signal strength estimate is being generated. Note that in the case of a virtual beacon signal no signal is actually transmitted and thus the reported received signal strength will not be that of a real received signal but a value to be reported in a beacon signal receipt message which reports receipt of a beacon signal which was never actually transmitted. The miss-representation that a beacon signal was received is a convenient and useful way of taking advantage of a beacon interface intended to support messages relating to actually received signals and for initiating actions based on the receipt of actual beacon signals.

The beacon message generator 420 uses the estimated received signal strength along with information identifying the beacon signal to which the estimated received signal strength corresponds and other information corresponding to the beacon signal which is available from the beacon information table 428. The message generated by the beacon message generator 420 will report to the beacon interface of a wireless terminal that a beacon was received, a received signal strength corresponding to the reported received beacon signal, a beacon identifier and/or other information relating to the beacon signal being received such as type of beacon signal and/or frequency band to which the received beacon signal corresponds. In the case of virtual beacon signals the signal is not actually received and thus the reported received signal strength and frequency are based on the information in the beacon information table 428 and/or the location of the wireless terminal. A single message may be generated for each beacon signal which would have been received if transmitted in accordance with the information included in the beacon information table 428 and if the wireless terminal had the physical receiver needed to receive the reported signal. However, as noted above in the case of virtual beacon signals the signals need not be transmitted and in the case of devices lacking an interface capable of receiving a beacon signal the wireless terminal may still receive a beacon receipt message at its beacon message interface from server 400 reporting receipt of a beacon signal that the wireless terminal was not physically capable of receiving. The control routines 416 including a beacon information updater 417 which updates the beacon information table 428 based on the schedule information 427 so that the information in the beacon information table 428 used by the beacon coverage area determinator 424 and received signal strength estimator 422 will reflect the current beacon transmitter information at any given time.

Figure 5:
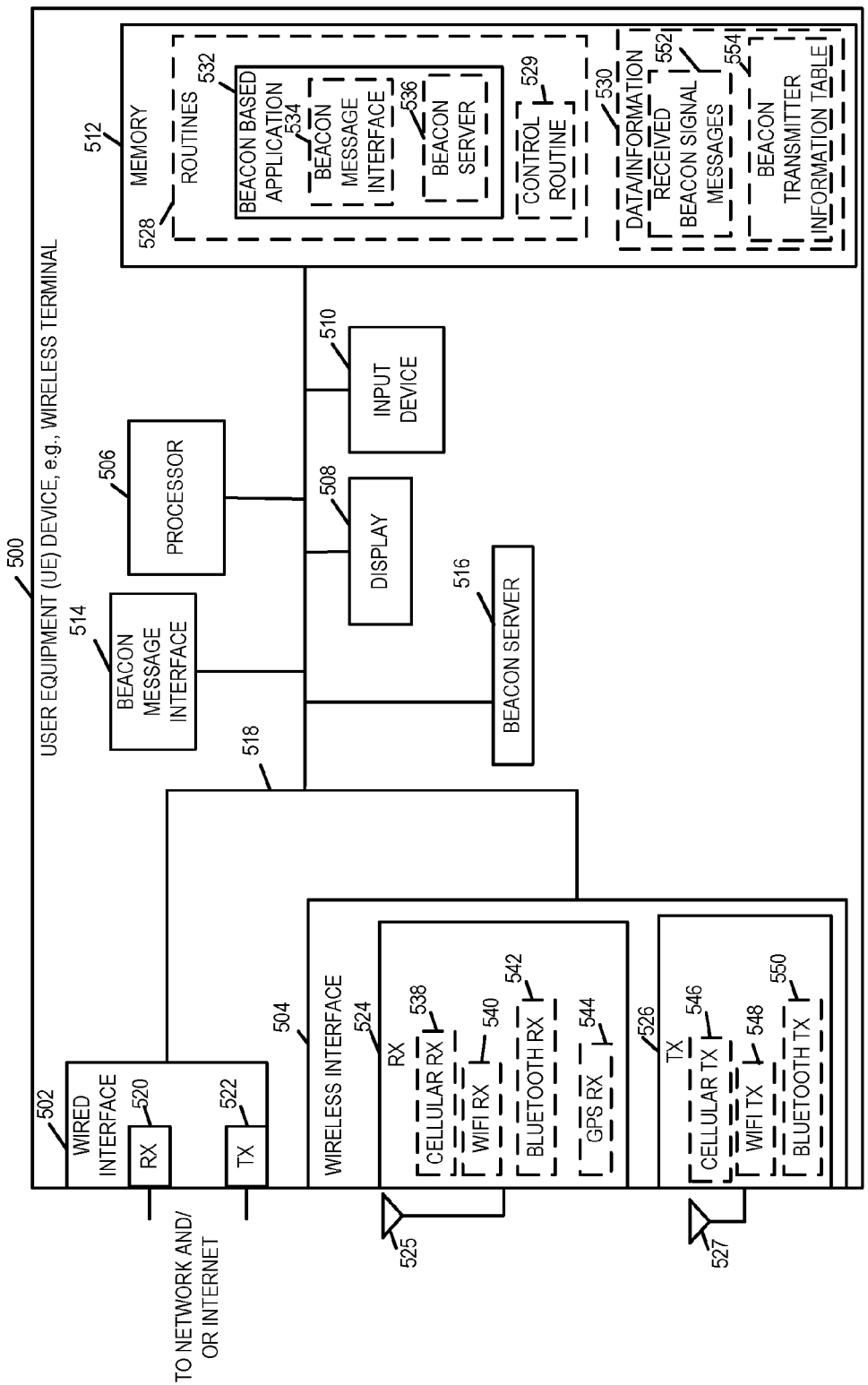
FIG. 5 shows an exemplary user equipment device, e.g., wireless terminal, which can generate and use messages relating to virtual beacon signals.

FIG. 5 shows an exemplary user equipment device, e.g., wireless terminal 500, which can generate and use messages relating to virtual beacon signals.

The wireless terminal 500 includes a wired interface 502 which includes a wired receiver 520 and a wired transmitter 522. The wireless terminal 500 also includes a wireless interface 504 which includes a wireless receiver 524 coupled to receive antenna 525 and a wireless transmitter 526 coupled to transmit antenna 527. The interfaces 502, 504 allow the wireless terminal to receive and send messages as well as measure the received signal strength of signals, e.g., beacon or other signals received by the wireless terminal 500. The receiver 524 may include a GPS receiver 544 in addition to a cellular receiver 538 and/or Bluetooth receiver 542 and/or a WIFI receiver 540. The transmitter 526 includes one or more or all of a cellular transmitter 546, a WiFi transmitter 548, and/or a Bluetooth transmitter 550. Messages and signals as well as received signal strength information can be communicated by the interfaces 502, 504 to the other components of the wireless terminal 500 via bus 518 which couples the interfaces to a beacon server 516, display 508, input device such as a keypad 510, beacon message interface 514, processor 506 and memory 512 including routines 528 and data/information 530. The data/information 530 includes received beacon signal messages 552 as well as a beacon transmitter information table 554 such as the one shown in FIG. 6 and which can be used by the beacon server 516 in some embodiments. While a physical beacon message interface 514 is included in some embodiments in other embodiments the beacon message interface is implemented as an application 534 as part of a beacon based application 532. Thus the beacon server 516, when included in the wireless terminal 500 may be implemented as a physical device, e.g., server including a processor, or as an application 536 executed by processor 506.

In embodiments where a network based beacon server is used and the beacon server 516, 536 are omitted from the wireless terminal 500, control routine 529 causes the wireless terminal 500 to send messages, e.g., via the wireless interface 504, to the network based beacon server 400 which responds with a message directed to the wireless terminal's beacon message interface 514 or 536 reporting the receipt of beacon signals by the wireless terminal 500 which may not have actually been received due to their virtual nature.

Figure 6:
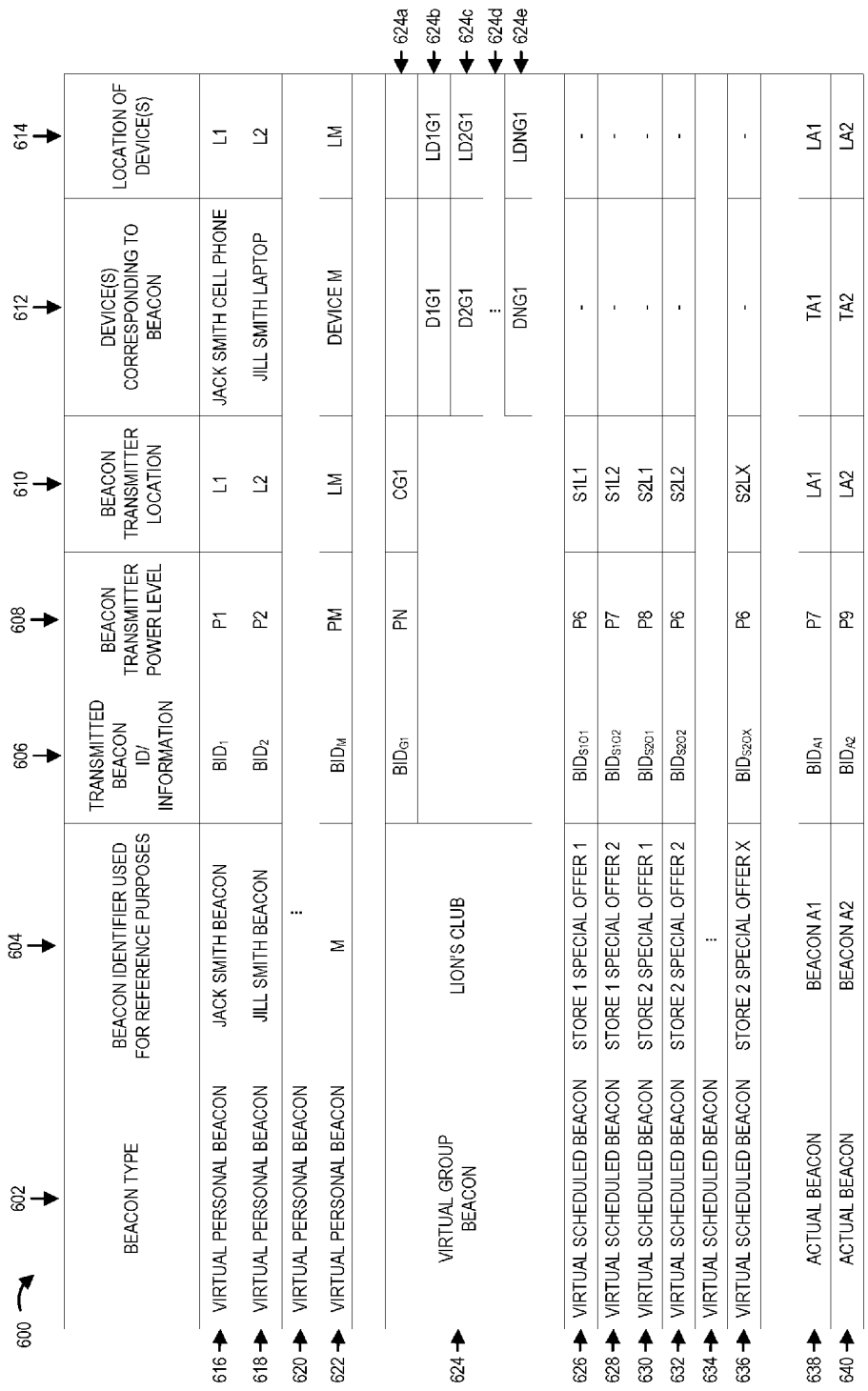
FIG. 6 shows an exemplary set of stored beacon information, e.g., a table, used in some embodiments during a first time period.

FIG. 6 shows an exemplary set of stored beacon information 600, e.g., a table, used in some embodiments during a first time period. The stored beacon information is stored in a wireless terminal or network based beacon server and is used to determine when a message should be sent to a beacon interface of a wireless terminal to indicate the receipt of a beacon signal, e.g., an actual or virtual beacon signal, which may not and in the case of a virtual beacon signal will not, have been received by the wireless terminal to whose interface the message is sent.

The beacon information table 600 may be used as the beacon information table 428 of exemplary server 400. In the beacon information table 600 the first column 602 includes beacon type information. The second column 604 includes a beacon identifier used for reference purposes. This may be the name of the person associated with a personal beacon, the name of a group corresponding to a group beacon and/or some other easy to understand identifier. Each of the rows 616, 618, 620, 622, 624, 626, 628, 630, 632, 634, 636, 638, 640 corresponds to a different beacon signal. Rows 616, 618, 620, 622 correspond to virtual personal beacon signals corresponding to an individual person and a device of the person whose location can be determined and used to indicate the location of the virtual beacon transmitters corresponding to the virtual beacon signal to which the device corresponds.

Row 624 corresponds to a virtual group beacon signal. The virtual group beacon signal is associated with individual devices of a group whose locations are used to determine the location and/or transmit power level for the virtual group beacon transmitter to which the devices correspond. Sub-rows 624b, 624c, 624d, 624e each include a device identifier of a device of a group member and its corresponding location. For example D1G1 is an identifier of device 1 of group 1 and LD1G1 is the location of device 1 of group 1. Thus for a group, the information table 600 includes location information for each of the devices in addition to a row 624a of information for the beacon ID of the group, e.g., BIDG1, the transmission power level to be used for the group, e.g., PN, and the location of the virtual group beacon transmitter, e.g., CG1. Note that the location is somewhere in the area in which the devices of the group are located, e.g., at the center of the group of devices, and the transmit power level in some embodiments is indicated to be sufficient to achieve a coverage area from the indicated group transmitter location which will reach all the devices in the group.

Rows 626, 628, 630, 632, 634, 636 correspond to virtual scheduled beacons. These beacons depend on a transmit schedule and the values in the information table 600 will be modified, e.g., updated, over time based on the transmit schedule.

While the information for virtual beacons is information for beacon signals which are not actually transmitted, the information in the table 600 can also include information for beacon signals which are actually transmitted, Rows 638, 640 include information for actual beacon transmitters (ABTs). For example row 638 may include information for ABT 1 110 and row 640 may include beacon information for ABT 2 112 of FIG. 1. Since the information in FIG. 6 relates to real as well as virtual beacon signals the message from the server 400 to a beacon interface of a WT may report the receipt of a virtual or real beacon signal neither of which may have actually been received by the WT to which the beacon receipt message is sent.

Each column of FIG. 6 provides a different type of information. As already discussed the first column 602 includes a beacon type indicator. The second column 604 includes the beacon identifier used for reference purposes. The third column 606 includes a transmitted beacon id and/or transmitted information which is communicated in the beacon signal. The fourth column 608 indicates beacon signal transmit power level information while the fifth column 610 includes the beacon transmitter location. Sixth column 612 identifies the device or devices corresponding to a beacon signal whose location can be used in dynamically changing the beacon transmitter location of the beacon corresponding to the device while seventh column 614 indicates the location of the device corresponding to the beacon included in the same row. In some embodiments the beacon information table 600 further includes a column with an entry in each row indicating the frequency band in which the beacon signal in the row corresponds and another column indicating the beacon signal type, e.g., iBeacon, Bluetooth beacon, LTE beacon, WiFi beacon, etc of the beacon in the row. Such additional columns are not shown in FIGS. 6 and 7 due to lack of space.

Figure 7:
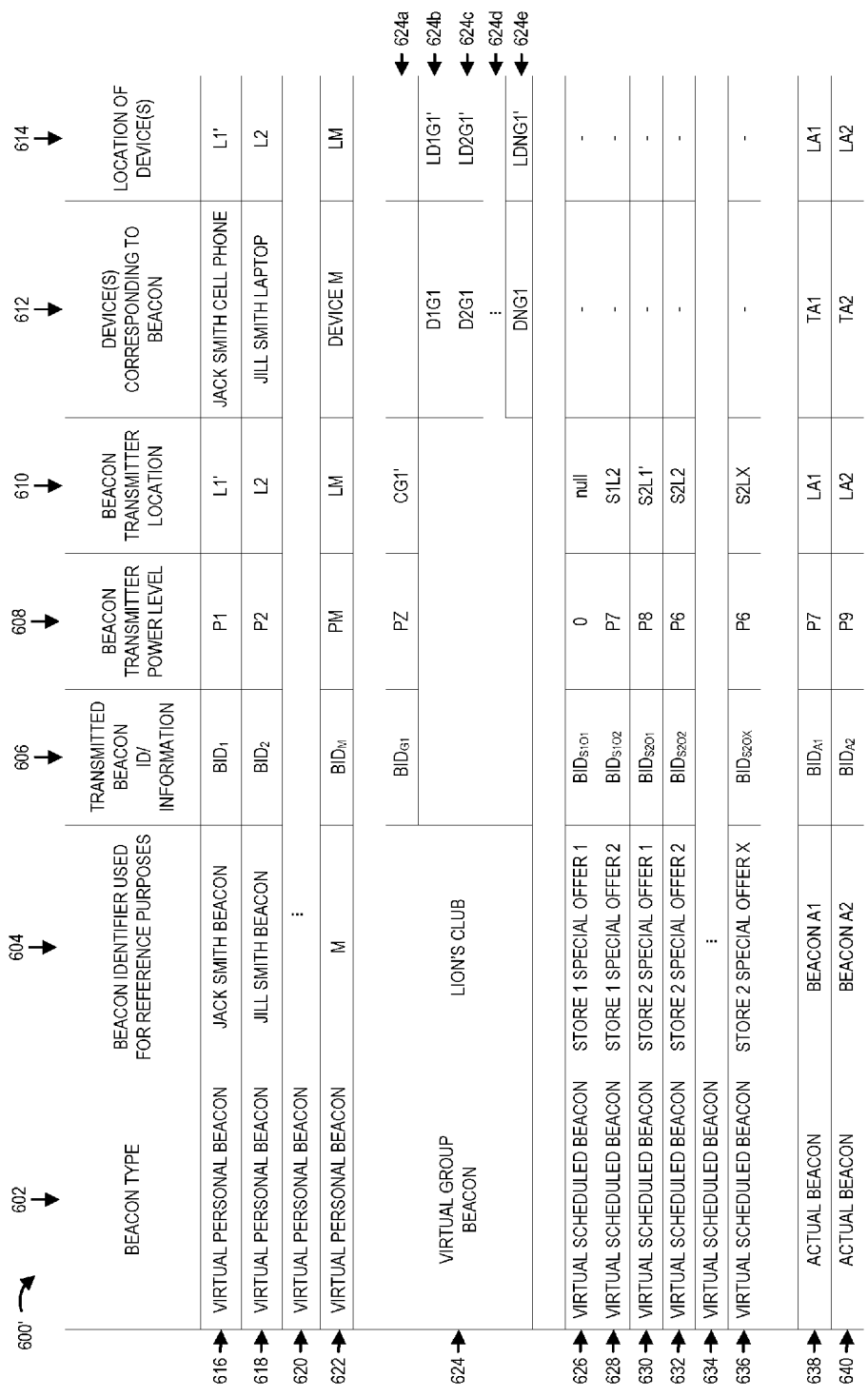
FIG. 7 shows the exemplary beacon information of FIG. 6 after being updated to be used at a second time period which follows the first time period.

FIG. 7 shows the exemplary beacon information of FIG. 6 after being updated to be used at a second time period which follows the first time period to which the information in FIG. 6 corresponds. Note that some of the transmitter and device locations in FIG. 7 differ from those shown in FIG. 6 and some of the transmit power levels are also different from what is shown in FIG. 6.

Figure 8A:
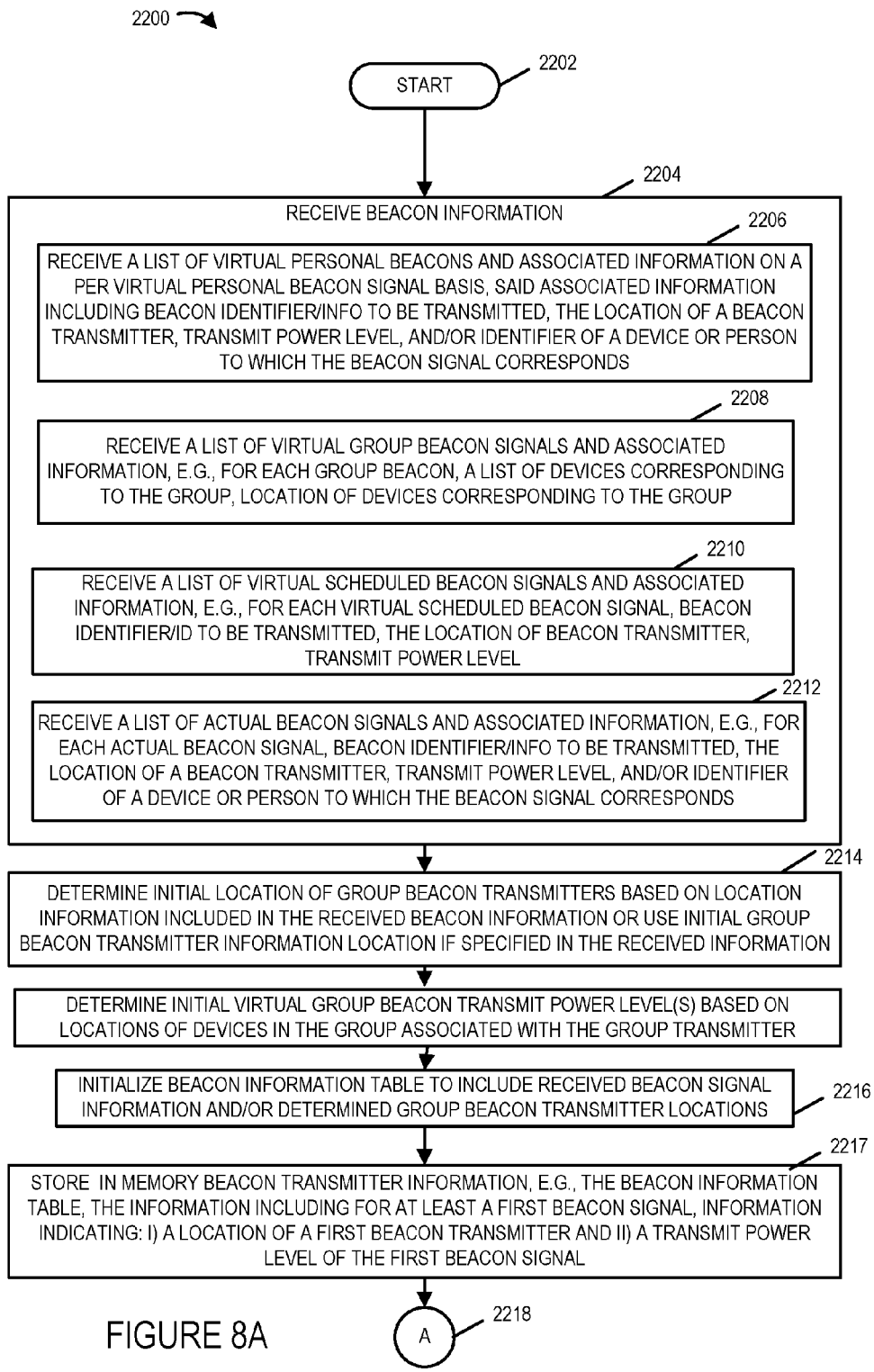
FIG. 8A is a first part of FIG. 8 which shows an exemplary method
Figure 8B:
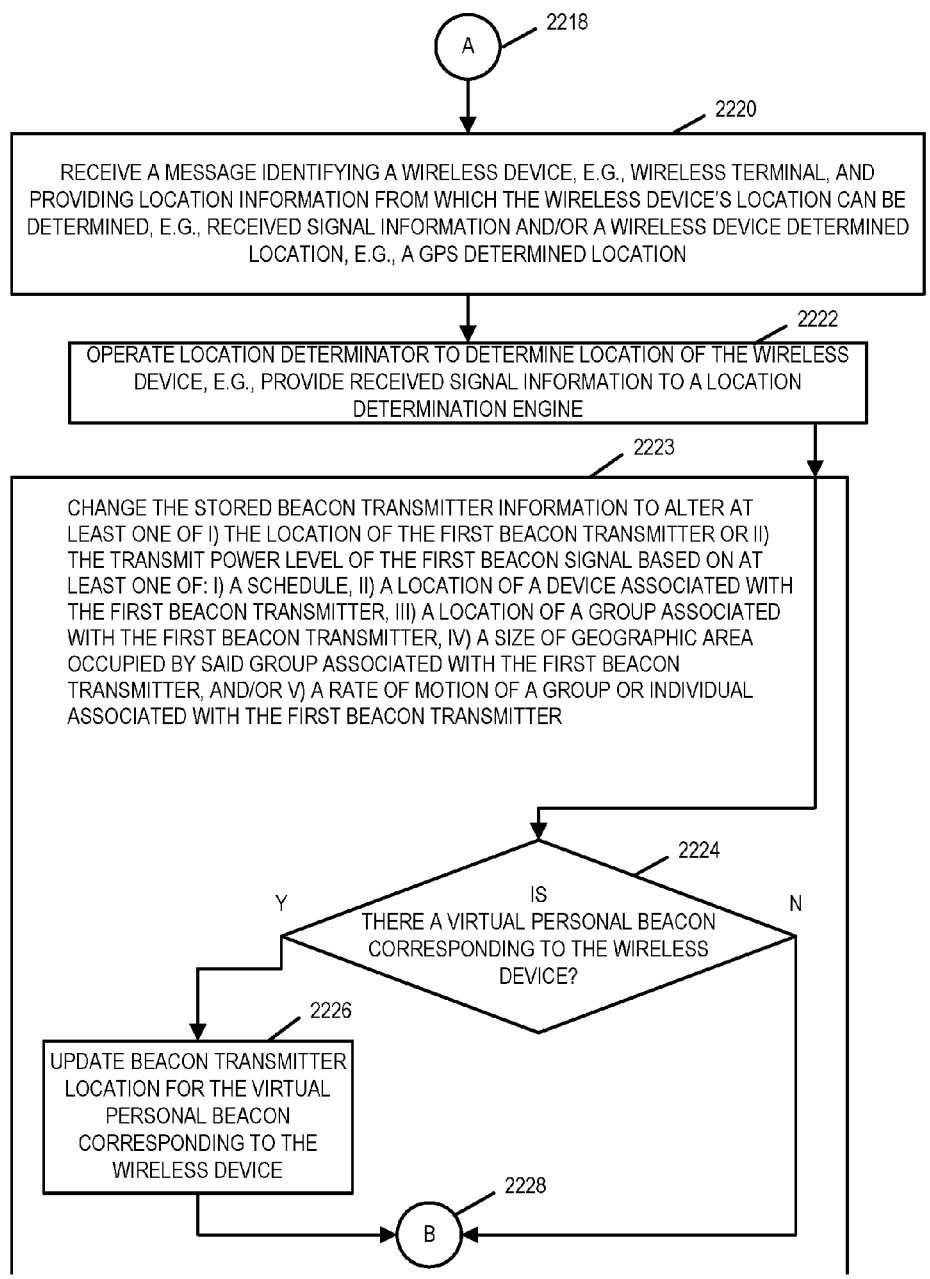
FIG. 8B is a second part of FIG. 8 which shows an exemplary method.
Figure 8C:
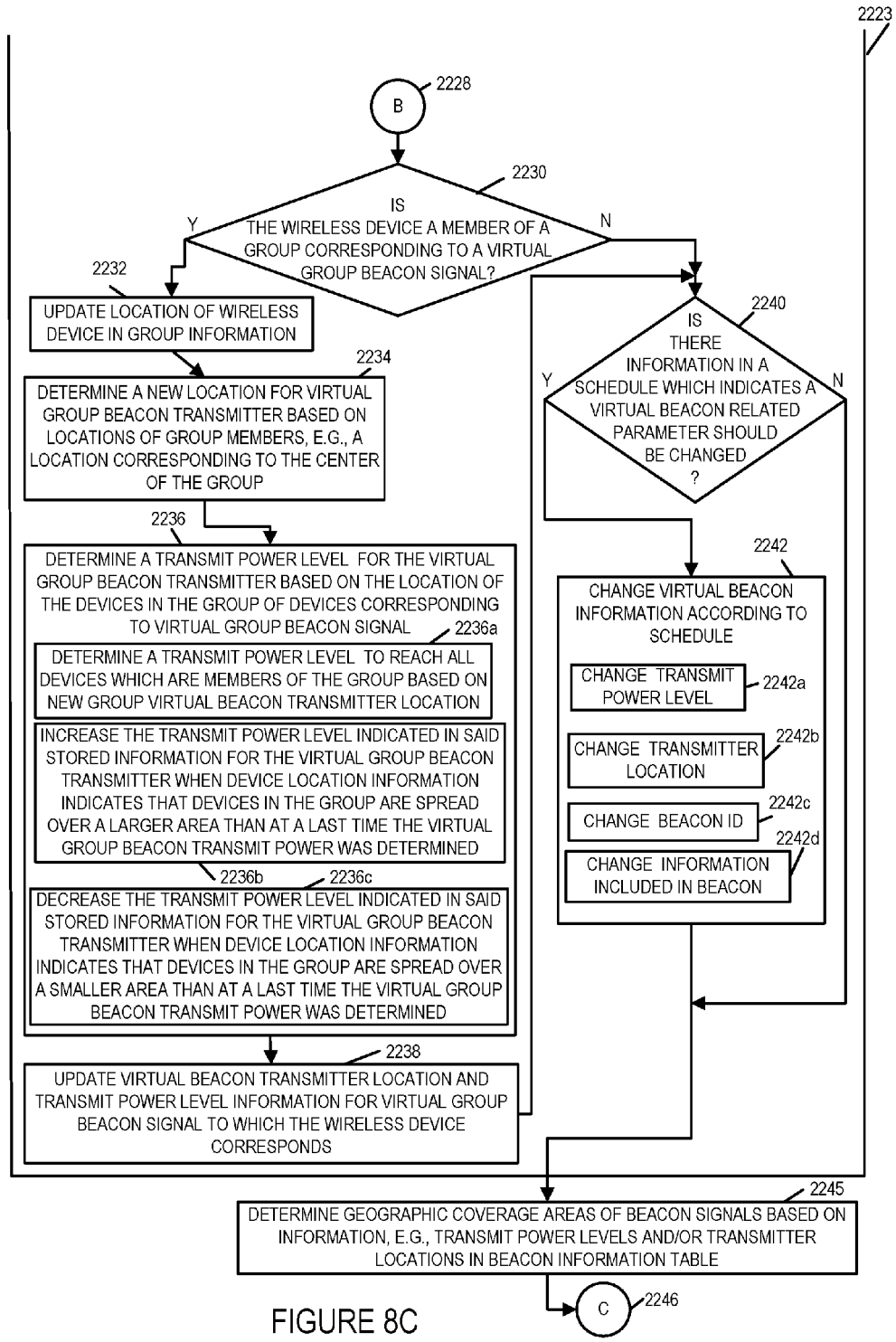
FIG. 8C is a third part of FIG. 8 which shows an exemplary method.

FIG. 8, which includes the combination of FIG. 8A through 8D illustrates an exemplary method of using beacon signal information, e.g., virtual and/or real beacon signal information, to generate messages which can be communicated to and used by a beacon interface of a user equipment device, e.g., wireless terminal.

FIG. 8, which includes the combination of FIG. 8A through 8D illustrates an exemplary method of using beacon signal information, e.g., virtual and/or real beacon signal information, to generate messages which can be communicated to and used by a beacon interface of a user equipment device, e.g., wireless terminal.

FIG. 8 illustrates the steps of a method 2200 which maybe implemented by a device such as beacon server 400. The method starts in step 2204 in which the device implementing the method begins performing the steps of the method. In step 2204 beacon information is received. This information maybe provided by a management device or other device responsible for initializing and providing information about virtual beacons real beacon signals corresponding to geographic area serviced by the beacon server 400 other device implementing the method shown in FIG. 8. The management device may generate and provide, with the information received in step 2204, a beacon transmission schedule, listing for one or more virtual beacons transmission time information, virtual beacon transmitter location information and virtual beacon transmitter power information. In this way the receiving device can determine how to modify the beacon transmission information over time to the extent that changes in beacon transmissions are schedule based.

In step 2204 various types of information, e.g., corresponding to different types of virtual and real beacon signals, is received.

The receipt of information corresponding to different types of beacon signals occurs in steps 2206, 2208, 2210 and 2212 which maybe implemented as part of step 2204.

In step 2206, a list of virtual personal beacons and associated information is received. The information is included on a per virtual personal beacon signal basis and includes, for a beacon signal associated information including a beacon transmitter identifier (ID), information to be transmitted, the location of a virtual beacon transmitter that is the transmitter of the virtual beacon signal, transmit power level information, and/or an identifier of a device or person to which the beacon signal corresponds. The information can also include beacon type, e.g., iBeacon, LTE beacon, Bluetooth Beacon and an indication of the frequency band in which the virtual beacon would be transmitted if it was actually transmitted. In step 2206, the information corresponding to the entries of the beacon information table for virtual personal beacon signals are received. For example in step 2206 the information in rows 616, 618, 620 and 622 maybe, and sometimes is, received.

In step 2208 virtual group beacon signal information is received. A list of virtual group beacon signals and associated information is received. For each group beacon signal the information received in step 2208 may and sometimes does include a list of devices corresponding to the group beacon signal and the group to which the beacon signal corresponds, information indicating the location of the devices corresponding to the group. Optionally the information may also include a location of the virtual group beacon transmitter and a power level of the virtual group beacon signal as well as frequency and beacon type information. The virtual group beacon signal information corresponding to row 614 of FIG. 6 is received in step 2208 in at least one embodiment. While the location and transmit power of the virtual group beacon transmitters is indicated in the received information in some embodiments in other embodiments the beacon server 400 determines this information based on the location of the devices in the group and the transmit power which would be required to reach all or a majority of the devices in the group.

In step 2210 information corresponding to virtual scheduled beacon signals is received. step 2210 includes in some embodiments receiving a list of virtual scheduled beacon signals and associated information. The information may include for each virtual scheduled beacon signal a beacon ID, information to be transmitted, the location of the corresponding virtual beacon transmitter, and the transmit power level associated with the scheduled virtual beacon signal. In one embodiment, the information included in rows 626, 628, 630, 632, 634, 636 is received in step 2210. A schedule indicating changes in the beacon information and indicating what beacon information should be used for what time periods maybe and sometimes is also received in step 2210.

Step 2212 involves the receipt of beacon signal information relating to actual beacon signals, e.g., signals which are actually transmitted by access points or other devices. In some embodiments in step 2212 a list of actual beacon signals and associated information is received. The information may and sometimes does include for each actual beacon signal a beacon identifier, information to be transmitted in the beacon signal, transmit power level information and/or an identifier of a device or person to which the beacon signal corresponds. Frequency and beacon type information maybe and sometimes is also received for the actual beacon signals just as it maybe received for each of the different types of virtual beacon signals discussed in the present application. In step 2212 the information in rows 638, 640 of FIG. 6 maybe and sometimes is received.

With the initial beacon information for an area having been received in step 2204, e.g., from a management device responsible for initial beacon configuration in an area, operation proceeds to step 2214. In step 2214 an initial location for each of the virtual transistors of virtual group beacon signals is determined. In embodiments where an initial location is indicated in the received information for a virtual group beacon transmitter, that location will be used for the corresponding virtual group beacon signal transmitter. However if a location was not indicated in the received information, a virtual group transmitter location is determined based on the locations of the devices in the group to which the virtual group transmitter corresponds. For example, in some embodiments the location of the virtual group transmitter is determined to be at the center of the area in which the devices in the group are determined to be located based on the indicated location of the devices in the group.

In step 2215 transmitter power levels for the virtual group beacon signals are determined based on device location if a power level was not specified in the received information. In some embodiments the power level for a virtual group beacon signal is determined based on the location of the virtual group beacon transmitter corresponding to the group to be sufficient that if transmitted from the location of the virtual group beacon transmitter a the virtual group beacon signal would be able to be received by all or most of the members of the group. Since the determined power level is of a virtual signal which is not actually transmitted it can be and sometimes is higher than would be permitted by regulations which constrains real transmit power levels. For example in one embodiment a virtual group beacon signal is implemented as a Bluetooth signal but with a power level far exceeding that permitted for actual Bluetooth devices.

Operation proceeds from step 2215 to step 2216 in which a beacon information table stored in memory is initialized with the received beacon signal information and/or determined virtual group beacon signal transmitter locations and corresponding transmit power levels. At the end of the initialization process the beacon information may look the same or similar to the one shown in FIG. 6.

In step 2217 the beacon transmitter information is stored in memory, e.g., of the beacon server 400 and/or in the memory of a wireless terminal including a beacon server 400 within the wireless terminal.

With the beacon information stored in memory, including information indicating at least for a first beacon signal: i) a location of a first beacon transmitter and ii) a transmit power level of the first beacon signal, operation proceeds via connecting node 2218 to step 2220.

In step 2220, a message identifying a wireless device, e.g., a wireless terminal and/or providing location information from which the wireless device's location can be determined is received. The received message maybe and sometimes is from a wireless device which is configured to send location information messages to a beacon server on a regular basis, e.g., a scheduled or periodic basis, or when received beacon information is required by an application or the beacon interface in the device sending the message. If the identity of the wireless device sending the message is known the identity need not be included in the message providing the location information, In some embodiments the location information is in the form of received signal measurements from which the device's location can be determined while in other embodiments the location information is a wireless device determined location, e.g., a location determined by a GPS receiver or another location determination device in the wireless communications device, e.g., wireless terminal. As should be appreciated the wireless terminals 116, 118, 120, 122, 124 may routinely send location information messages to the beacon server for processing and such messages maybe received in step 2220.

Operation proceeds from step 2220 to step 2222. In step 2222, a location determinator, e.g., location determination engine 418, is operated to determine the location of the wireless device, e.g., the wireless terminal, from which the message in step 2220 providing received signal information was received. The location determinator maybe a device which determines a location of the wireless device based on received signal strength information and information about the known locations of the devices, e.g., access points, which transmitted the signals which were reported as being received and for which received signal strength information was supplied for use as location determination information. Based on the strength of signals received from known access points, such as access points 110, 112, 114 the location of the wireless device is determined and made available for use in controlling and/or updating device location information used for determining the location of one or more virtual beacon transmitters.

Operation proceeds from step 2222, with the location of the wireless device from which a message was received being known and available for use in subsequent steps, to step 2223.

In step 2223 a change is made to stored beacon transmitter information. The change maybe and sometimes is based on a change in the location of the wireless device and/or the change maybe based on a schedule used to control scheduled virtual and/or real beacon transmissions. The implement change may and sometimes is based on the location of the wireless device expressly indicated in the information received in step 2220 or determined in step 2222 from the received information relating to the wireless device.

The change to the beacon transmitter information made in step 2223 includes altering at least one of i) a change in a location of a first beacon transmitter or ii) changing the transmit power level associated with the first beacon signal. The change is based on at least one of i) a schedule, ii) location of a device associated with the first beacon transmitter and thus first beacon signal indicated to be transmitted by the first beacon transmitter, iii) a location of a group of devices associated with the first beacon transmitter, iv) a size of a geographic area occupied by the group associated with the first beacon transmitter and/or v) a rate of motion of a group or individual associated with the first beacon transmitter. The first beacon transmitter maybe, for example the first beacon transmitter corresponding to the first row 616 of FIG. 6 with the location of the beacon transmitter being changed from location L1 to location L1' as shown in FIG. 7, when the device, Jack Smits cell phone, provides location information in a massage to beacon server 400 indicating a change in location from L1 to L1'. Alternatively the change made in step 2223 maybe a change in beacon transmitter location from CG1 to CG1' which is different from CG1, of the virtual beacon transmitter corresponding to the virtual group beacon for which information is provided in row 624 of FIG. 6. As the location of the devices corresponding to the group change from the locations indicated in FIG. 6 to the device locations indicated in FIG. 7, the virtual group beacon transmitter location is changed form the center of the location of the group of device locations shown in FIG. 6 to the center CG1' of the device locations LD1G1', LD2G1', LDNG1' shown in FIG. 7. The power of the virtual group transmitter is also changed from PN to PZ, e.g., increased or decreased between the time shown in FIG. 6 and FIG. 7, to take into consideration the change in the amount of power a beacon signal transmitted form the new group beacon transmitter location would have to have to reach the members of devices D1G1, D2G1, DnG1, corresponding to the first group, G1. Changes based on a schedule may also include a beacon change due to a schedule such as stopping of the virtual scheduled beacon of row 626 between the time corresponding to FIGS. 6 and 7 resulting the beacon information corresponding to row 626 being changed, e.g., with the transmit power being set to 0 and the location being nulled since the virtual transmitter corresponding to the beacon signal of row 626 is not used at the time to which the FIG. 7 beacon information table corresponds. Consider for example that the location of a virtual scheduled beacon can also change with time. For example, the location of the store 2 special offer 1 beacon transmitter is changed from location S2L1 (store 2 location 1) to S2L1' between the time corresponding to FIG. 6 and the time corresponding to FIG. 7.

This maybe, e.g., to move the virtual special offer beacon further away from the entry door and further into store 2.

Step 2223 may include a number of steps depending on the type of virtual beacon information change being made in step 2223 and whether the device for which new location information is determined in step 2222 corresponds to a virtual personal beacon signal which is to move as the person's device moves and/or the wireless device is a member of a group for which a virtual group beacon signal is supported.

In some embodiments step 2223 includes step 2224 in which a decision is made as to whether or not there is a virtual personal beacon corresponding to the wireless device, e.g., the wireless device for which a new location was determined in step 2222 or indicated in step 2220. If in step 2224 it is determined that there is a virtual personal beacon corresponding to the wireless device whose location was determined operation proceeds to step 2226. In step 2226 beacon transmitter location information is updated for the virtual personal beacon corresponding to the wireless device. For example, the location of the personal transmitter is changed from an old location of the device to the newly determined device location thereby effectively moving the virtual personal beacon transmitter so that it follows the device with which it is associated. While a physical transmitter is not moved, the server 400 will use the new virtual beacon transmitter location when determining other devices whether they received the virtual personal beacon signal. Thus to devices, e.g., WTs, in the system it appears as if a virtual personal beacon transmitter moves with the device of the person associated with virtual personal beacon transmitter while no physical transmitter need be moved.

Operation proceeds from step 2226 to step 2230 via connecting node B 228 or directly from step 2224 to step 2230 in the case where there is no virtual personal beacon corresponding to the wireless device whose location was determined.

In step 2230 a check is made to determine if the wireless device whose location was determined is a member of a group, e.g., if the device location information needs to be updated for a corresponding group.

In step 2230 if it is determined that the wireless device is a member of a group corresponding to a virtual group beacon signal operation proceeds to step 2232. In step 2232 the location of the wireless device in the group information for the virtual group beacon signal to which the wireless device corresponds is updated. For example, if the wireless device is a member of the lions club group shown in FIG. 6, the device location information would be updated and reflected in an updated information table such as the one shown in FIG. 7. For example between the time to which FIG. 6 corresponds and the time to which FIG. 7 corresponds the location for device D1G1 is updated from LD1G1 to LD1G1'.

With the device location having been updated operation proceeds to step 2234. In step 2234 a new location for the virtual group beacon transmitter corresponding to the group of which the wireless device is a member is updated to take into consideration the new device location. For example, based on new device location LD1G1' a new group transmitter location CG1' may be determined based on the new center of the group of devices corresponding to the Lions Club virtual group beacon.

Operation proceeds from step 2234 to step 2236 in which a transmit power level for the virtual group transmitter whose location was updated in step 2234 is determined based on the location of the devices in the group of devices corresponding to the virtual group beacon signal. For example, virtual group transmitter power maybe changed for the lions club virtual group beacon signal from PN to PZ based on the locations of the devices of the group members shown in FIG. 7 which is different from the locations shown in FIG. 6.

Step 2236 includes one or more of steps 2236a, 2236b and 2236c in some embodiments. In step 2236a a transmit power level sufficient to reach all of the devices which are members of the group is determined based on the new group virtual beacon transmitter location determined in step 2234. Since the beacon is a virtual beacon and not actually transmitted, the determined transmit power is not constrained by regulations limiting actual transmit power and can and sometimes does exceed a maximum transmit power level permitted by regulations applicable to beacon transmitters at the determined new location. Thus as a group of devices spreads out virtual beacon transmit power can be increased so that the virtual beacon signal corresponds to a virtual beacon coverage area, e.g., zone, which is larger than would be possible using an actual beacon transmitter subject to physical power transmission limits.

In step 2236b the transmit power level associated with the virtual group beacon signal is increased when the device location information indicated that devices in the group are spread over a larger area than at a last time the virtual group beacon transmit power was determined and/or updated. Thus if a change in a devices location increase the area over which the group of devices is spread the group beacon transmit power will be increased in some embodiments to cover the larger area.

In step 2236c the transmit power level of a virtual group beacon signal transmitter is decreased in the stored beacon signal information when the new device location information indicates that the group of devices is spread over a smaller area than at a last time the virtual group beacon transmit power was determined and/or updated.

Operation proceeds from step 2236 to step 2238 in which the virtual beacon transmitter location and/or transmit power level information is updated in memory for the virtual group beacon signal corresponding to the wireless terminal for which a location was determined or indicated. Thus virtual group beacon signal information, like virtual personal beacon signal information is updated to take into consideration the new location of a device corresponding to the particular virtual beacon signal information.

Operation proceeds from step 2238 to step 2240 or directly to step 2240 from step 2230 if no virtual group beacon signals are associated with the wireless device whose location was determined.

In step 2240 a determination is made if there is information in a schedule which indicates a virtual beacon related parameter should be changed. If there is no information indicating a scheduled change which is to be implemented at the time the check is made in step 2240 operation proceeds to step 2245 but if a scheduled change in a virtual beacon signal needs to be made, operation proceeds to step 2242. In step 2242 virtual beacon information is changed according to the beacon information schedule. The change may include a change to a virtual transmit power level made in step 2242a, a change in virtual beacon signal transmitter location made in step 2242b, a change in a beacon identifier made in step 2242c and/or a change in information included in beacon signal made in step 2242d. Additional changes which are made in some embodiments include a change in the type of virtual beacon signal which is indicated as being transmitted and/or a change in the frequency band indicated as being used to transmit the virtual beacon signal. As previously noted the beacon signals which are virtual are not actually transmitted and thus do not actually use the frequency spectrum used for the transmission. Thus in some embodiments a blue tooth or other virtual beacon can be and is indicated as being transmitted in a licensed or other frequency spectrum in which such a beacon could not actually be transmitted.

Operation proceeds from step 2242 to step 2245. In step 2245 a determination is made as to the geographic coverage areas of the virtual and real beacon signals for which information is available in the beacon information stored in memory. The determination of the geographic coverage areas, e.g., zones, corresponding to individual real and virtual beacon signals is made based on the indicated beacon transmit signal power levels and corresponding transmitter locations indicated in the stored beacon information. This maybe, and sometime is done, using a path loss model which takes into consideration how a radio signal falls off from the transmitter location as a function of distance and/or know objects in the environment which may block all or some of the virtual beacon signals if they were in fact transmitted.

Operation proceeds from step 2245 to step 2248 via connecting node 2246. In step 2248 a determination is made as to whether the wireless device, e.g., whose location was determined, is within a coverage area of one or more beacon signals, e.g., zones. The zones may correspond to a virtual or real beacon signal coverage area. If the wireless terminal is in a beacon signal coverage area a beacon signal strength is determined for each beacon signal coverage area, e.g., zone, in which the wireless device is located. To do this operation proceeds from step 2248 to step 2250. In step 2250 a beacon signal strength to be reported is determined for a first beacon signal in whose coverage area the wireless device is located. The received signal strength to be reported for the first beacon signal is determined based on the location of the wireless terminal and the information stored in memory indicating the location of the beacon transmitter that transmits the first beacon signal and the transmit power level of the first beacon signal. The estimated received signal strength uses the location of the transmitter, wireless terminal and transmit power to predict, using a path loss model, the strength of the first beacon signal at the wireless terminal location which is the expected received signal strength of the first beacon signal. An expected received signal strength is generated in step 2250 for each beacon signal in whose coverage zone the wireless terminal is located.

Operation proceeds from step 2250 to step 2252. In step 2252 a message is generated, a received beacon signal message, indicating receipt of one or more beacon signals and providing the information about the received beacon signal that would normally be produced by a receiver which received an actual beacon signal. The generated message, indicating receipt of the first beacon signal includes the received signal strength of the first beacon signal determined ins step 2250, a beacon identifier corresponding to the first beacon signal, information communicated by the first beacon signal, beacon type information indicating what type of beacon signal the first beacon signal is, the frequency band in which the first beacon signal was received and/or a time stamp indicating a time of receipt of the first beacon signal. The time stamp may be the time at which the wireless device was at the determined location used to determine what beacon signals should be reported as being received to the wireless terminal. A single message maybe generated for each virtual or real beacon signal to be reported to the wireless device as having been received or multiple reports of received beacon signals maybe combined and communicated in a single message to the wireless device.

With the message or messages having been generated in step 2252 the messages are communicated in step 2254 to the wireless device or a component, e.g., beacon signal interface, in the wireless device which acts upon received beacon signal information. The message may be the same or similar to a message which would be provided to the component in the wireless device, e.g., beacon interface, which would be supplied with such information from a receiver in the wireless terminal which received an actual beacon signal.

Thus, via message the wireless device or component in the wireless device is provided with information that a beacon signal was received while in the case of a virtual beacon signal no such signal was actually transmitted or received.

When a server 400 external to the wireless device, e.g., wireless terminal communicates the received beacon signal message, the message maybe sent over a wired or wireless communication network which uses a different frequency band than that to which the reported received beacon signal corresponds. For example the message maybe communicated to the wireless terminal via a cellular network while the message reports receipt of a WiFi or Bluetooth beacon which, if transmitted, would be transmitted in a frequency band that is different from a cellular frequency band used communicate the received beacon signal message.

The received beacon signal information can be used by an application designed to use received beacon signal information without requiring a modification to the application's interface in many cases. This is because the application will behave in a predictable way in response to the report of receipt of a received beacon signal with, in many cases the application not knowing that the reported received beacon signal was a virtual beacon signal which was never really transmitted or received.

By miss-representing the receipt of a beacon signal, by reporting receipt of a virtual beacon signal that was never really received, use of exiting cellular device applications with beacon interfaces can be used to support a wide range of features and functions that they might not be able to support if they were limited to use of reports of receiving real beacon signals. For example a communication application intended to notify group members of the location of devices corresponding to other group members can be used to show devices over geographic ranges which actual beacon signals could not be transmitted but which can easily be covered using a virtual beacon signal with a power level that would not be permitted for an actual beacon signal due to maximum power transmission regulations.

Once sent the message reporting the received beacon signal is received by a component, e.g., beacon signal interface of the wireless device to which the message is sent. In step 2256 the beacon signal interface of the wireless device is operated to act on the received message from the beacon server. Step 2256 would be performed by the wireless device if separate from the beacon server but in cases where the beacon server is part of the wireless device, the message would be sent by the beacon server in the device and received and acted upon by the beacon interface in the same device.

The action taken in response to the message indicating beacon signal receipt will depend on the application using the information that a beacon signal was received. The action may, and in some embodiments does include outputting beacon signal information on a display including information relating to a group from whom a group beacon signal was reported as being received, showing the location of a person on a map as determined from the received signal strength reported in a message indicating the receipt of a virtual personal beacon corresponding to the person or some other action. The message reporting of a received beacon signal may cause the wireless device to send another message, e.g., to members of group in an attempt to establish communication with a member of the group from which a virtual group beacon signal was received. These are but a few examples of actions which maybe automatically taken by a wireless device receiving a message reporting receipt of a virtual beacon signal. Numerous other actions are also possible.

Operation proceeds from step 2256 to return step 2258. Operation proceeds from step 2248 to return step 2258 if the wireless device is not in a beacon coverage area. The return step causes operation to return to step 2220 or another point in the method to allow operations to continue with beacon signal information changes being made as new information on a device location or beacon schedule becomes available. Thus devices interacting with beacon server 400 will routinely be provided with received signal messages as the server 400 becomes aware of a change in their location or another change which would normally result in the wireless device receiving a beacon signal if it was actually transmitted.

An exemplary communications method in accordance with one embodiment includes determining (2250), based on a location of a wireless device and information stored in memory indicating a location of a first beacon transmitter, a beacon signal strength to be reported, said beacon signal strength to be reported being an expected received beacon signal strength of a first beacon signal at the location of said wireless device given the indicated location of said first beacon transmitter in said memory; and communicating (2254) a message indicating the determined received beacon signal strength to the wireless device or a component in said wireless device which acts upon received beacon signal information.

In some embodiments the message is a message reporting receipt of the first beacon signal (2252), said message including in addition to the received beacon signal strength information a beacon identifier or other information indicated in memory to be communicated by said first beacon signal.

In some embodiments the method further comprises: storing (2217) in memory, prior to said step of determining the beacon signal strength to be reported, beacon transmitter information, said beacon transmitter information including for the first beacon signal, information indicating: i) a location of a first beacon transmitter and ii) a transmit power level of the first beacon signal; and changing (2223) the stored beacon transmitter information to alter at least one of i) the location of the first beacon transmitter or ii) the transmit power level of the first beacon signal based on at least one of: i) a schedule, ii) a location of a device associated with the first beacon transmitter, iii) a location of a group associated with the first beacon transmitter, iv) a size of geographic area occupied by said group associated with the first beacon transmitter, or v) a rate of motion of a group or individual associated with the first beacon transmitter.

In some embodiments determining (2250) a beacon signal strength to be reported is further based on the transmit power level of the first beacon signal indicated in said memory. In some embodiments the first beacon transmitter is a virtual beacon transmitter which does not transmit a physical signal.

In some embodiments changing the stored beacon transmitter information to alter at least one of i) the location of the first beacon transmitter or ii) the transmit power level of the first beacon signal, is based on a first schedule, said first schedule indicating different locations of said first beacon transmitter for different time periods, said step (2242) of changing including: changing (2242*b*) the stored first beacon transmitter location information to match a location indicated in said schedule for a current time period.

In some embodiments changing the stored beacon transmitter information to alter at least one of i) the location of the first beacon transmitter or ii) the transmit power level of the first beacon signal is based on a first schedule, said first schedule indicating different power levels of said first beacon transmitter for different time periods, said step of changing (2242) including: changing (2242*a*) the stored first beacon transmitter power level information to match a transmit power level indicated in said schedule for the current time period.

In some embodiments the wireless device is associated with the first beacon transmitter, the method further comprising: receiving (2220) information from which the location of the wireless device associated with the first beacon transmitter can be determined. In some embodiments changing the stored beacon transmitter information to alter at least one of i) the location of the first beacon transmitter or ii) the transmit power level of the first beacon signal includes: changing (2226) the location of the first beacon transmitter based on the location of the wireless device associated with the first beacon transmitter, said wireless device being a mobile wireless terminal which moves over time.

In some embodiments the information indicating the location of the wireless device associated with the first beacon transmitter includes received signal strength information, the method further comprising: operating a location determination device to determine (2222) the location of the wireless device based on the received signal strength information. In some embodiments the first beacon signal is a virtual group beacon signal and the first beacon transmitter is a virtual group beacon transmitter. In some embodiments the wireless device is a first device in a group of devices associated with the virtual group beacon signal. In some embodiments the method further comprises: updating (2232) a location of said first device in stored group information to indicate that the location of the first device is the determined location of the first device; and determining (2234) a new location for the virtual beacon transmitter based on locations of devices in said group of devices associated with virtual group beacon signal, said locations of devices including the determined location of the first device.

In some embodiments the method further comprises: determining a transmit power level (2236) for the virtual group beacon transmitter based on the location of the devices in the group of devices corresponding to virtual group beacon signal. In some embodiments the determining a transmit power level includes determining (2236*a*) a transmit power level to reach all devices which are members of said group of devices associated with the virtual group beacon signal.

In some embodiments the determining a transmit power level includes: increasing (2236*b*) the transmit power level indicated in said stored information for the virtual group beacon transmitter when device location information indicates that the devices in the group are spread over a larger area than at a last time the virtual group beacon transmitter transmit power was determined and decreasing (2236*c*) the transmit power level indicated in said stored information for the virtual group beacon transmitter when device location information indicates that the devices in the group are spread over a smaller area than at the last time the virtual group beacon transmitter transmit power was determined.

In some embodiments the determined transmit power level exceeds a transmit power level permitted by regulations at the indicated location of the virtual group beacon transmitter. In some embodiments the storing, changing, determining and communicating steps are performed by a network based beacon server coupled to said wireless communications device by a wireless communications link.

In some embodiments the storing, changing, determining and communicating steps are performed by a beacon server included in said wireless terminal. In some such embodiments communicating the message indicating the determined received beacon signal strength includes communicating the message to the component in said wireless device which acts upon received beacon signal information, said component being a beacon signal interface for receiving and processing messages indicating receipt of beacon signals.

In some embodiments the message indicating the determined received beacon signal strength includes a beacon ID of the beacon signal being reported as being received, a received signal strength of the beacon signal being reported as being received, a received time indicating a time of receipt of the beacon signal being reported as being received.

In some embodiments the message further includes a beacon type indicator and a frequency indicator. In some embodiments the message is transmitted using a different frequency band than the frequency band in which the beacon signal reported as being received is indicated to have been received in. In some embodiments the beacon signal reported as being received is a virtual beacon signal which was not received by the wireless communications device to which said message is sent.

An exemplary communications device in accordance with an exemplary embodiment comprises: memory including stored information indicating a location of a first beacon transmitter; a processor configured to: determine, based on a location of a wireless device and said information indicating the location of the first beacon transmitter, a beacon signal strength to be reported, said beacon signal strength to be reported being an expected received beacon signal strength of a first beacon signal at the location of said wireless device given the indicated location of said first beacon transmitter in said memory; and communicate a message indicating the determined received beacon signal strength to the wireless device or a component in said wireless device which acts upon received beacon signal information.

In some embodiments the message is a message reporting receipt of the first beacon signal, said message including in addition to the received beacon signal strength information a beacon identifier or other information indicated in memory to be communicated by said first beacon signal. In some embodiments the memory includes stored beacon transmitter information, said beacon transmitter information including for the first beacon signal, information indicating: i) the location of the first beacon transmitter and ii) a transmit power level of the first beacon signal. In some embodiments the processor is further configured to change the stored beacon transmitter information to alter at least one of i) the location of the first beacon transmitter or ii) the transmit power level of the first beacon signal based on at least one of: i) a schedule, ii) a location of a device associated with the first beacon transmitter, iii) a location of a group associated with the first beacon transmitter, iv) a size of geographic area occupied by said group associated with the first beacon transmitter, or v) a rate of motion of a group or individual associated with the first beacon transmitter.

In some embodiments said processor is configured to determine a beacon signal strength to be reported further based on the transmit power level of the first beacon signal indicated in said stored beacon transmitter information. In some embodiments the first beacon transmitter is a virtual beacon transmitter which does not transmit a physical signal.

In some embodiments the processor is configured to change the stored beacon transmitter information to alter at least one of i) the location of the first beacon transmitter or ii) the transmit power level of the first beacon signal, based on a first schedule, said first schedule indicating different locations of said first beacon transmitter for different time periods, said processor being further configured to change the stored first beacon transmitter location information to match a location indicated in said first schedule for a current time period.

In some embodiments the processor is configured to change the stored beacon transmitter information to alter at least one of i) the location of the first beacon transmitter or ii) the transmit power level of the first beacon signal, based on a first schedule, said first schedule indicating different power levels to be used by said first beacon transmitter for different time periods, said processor being further configured to change the stored first beacon transmitter power level information to match a transmit power level indicated in said first schedule for the current time period.

In some embodiments the wireless device is associated with the first beacon transmitter. In some embodiments the communications device further comprises a receiver configured to receive information from which the location of the wireless device associated with the first beacon transmitter can be determine. In some embodiments the processor is further configured, as part of being configured to change the stored beacon transmitter information to alter at least one of i) the location of the first beacon transmitter or ii) the transmit power level of the first beacon signal, to change the location of the first beacon transmitter based on the location of the wireless device associated with the first beacon transmitter, said wireless device being a mobile wireless terminal which moves over time.

In some embodiments the information indicating the location of the wireless device associated with the first beacon transmitter includes received signal strength information. In some embodiments the communications device further comprises: a location determination device configured to determine the location of the wireless device based on the received signal strength information.

In some embodiments the first beacon signal is a virtual group beacon signal, the first beacon transmitter is a virtual group beacon transmitter and the wireless device is a first device in a group of devices associated with the virtual group beacon signal. In some embodiments the processor is further configured to: update a location of said first device in stored group information to indicate that the location of the first device is the determined location of the first device; and determine a new location for the virtual beacon transmitter based on locations of devices in said group of devices associated with virtual group beacon signal, said locations of devices including the determined location of the first device.

The techniques of various embodiments may be implemented using software, hardware and/or a combination of software and hardware. Various embodiments are directed to apparatus, e.g., mobile nodes such as mobile wireless terminals, base stations, communications system. Various embodiments are also directed to methods, e.g., method of controlling and/or operating a communications device, e.g., wireless terminals (UEs), base stations, control nodes and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, signal generation, transmitting, processing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the steps of one or more methods of the invention.

In some embodiments, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with user equipment devices, e.g., mobile nodes, using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a device in a communications system, the method comprising:
    storing in memory, beacon transmitter information, said beacon transmitter information including for a first beacon signal, information indicating: i) a location of a first beacon transmitter and ii) a transmit power level of the first beacon signal;
    determining, based on the location of a wireless device and the information stored in said memory indicating the location of the first beacon transmitter, a beacon signal strength to be reported, said beacon signal strength to be reported being an expected received beacon signal strength of the first beacon signal at the location of said wireless device given the location of said first beacon transmitter indicated by the information in said memory; and communicating a message indicating the determined received beacon signal strength to the wireless device or a component in said wireless device which acts upon received beacon signal information; and changing the stored beacon transmitter information to alter at least one of: i) the location of the first beacon transmitter or ii) the transmit power level of the first beacon signal based on at least one of: i) a schedule, ii) a location of a device associated with the first beacon transmitter, iii) a location of a group associated with the first beacon transmitter, iv) a size of geographic area occupied by said group associated with the first beacon transmitter, or v) a rate of motion of a group or individual associated with the first beacon transmitter.

2. The method of claim 1, wherein said message is a message reporting receipt of the first beacon signal, said message including in addition to the received beacon signal strength information a beacon identifier or other information indicated in said memory to be communicated by said first beacon signal.

3. The method of claim 1, wherein the wireless device is a mobile wireless terminal.

4. The method of claim 3, wherein determining the beacon signal strength to be reported is further based on the transmit power level of the first beacon signal indicated in said memory.

5. The method of claim 3, wherein said first beacon transmitter is a virtual beacon transmitter which does not transmit a physical signal.

6. The method of claim 3, wherein changing the stored beacon transmitter information to alter at least one of i) the location of the first beacon transmitter or ii) the transmit power level of the first beacon signal, is based on a first schedule, said first schedule indicating different locations of said first beacon transmitter for different time periods, said step of changing including:

changing the stored first beacon transmitter location information to match a location indicated in said schedule for a current time period.

7. The method of claim 6, wherein changing the stored beacon transmitter information to alter at least one of i) the location of the first beacon transmitter or ii) the transmit power level of the first beacon signal is based on a first schedule, said first schedule indicating different power levels of said first beacon transmitter for different time periods, said step of changing including:

changing the stored first beacon transmitter power level information to match a transmit power level indicated in said schedule for the current time period.

8. A method of operating a device in a communications system, the method comprising:

determining, based on a location of a wireless device and information stored in memory indicating a location of a first beacon transmitter, a beacon signal strength to be reported, said beacon signal strength to be reported being an expected received beacon signal strength of a first beacon signal at the location of said wireless device given the indicated location of said first beacon transmitter in said memory, the wireless device being associated with the first beacon transmitter;

communicating a message indicating the determined received beacon signal strength to the wireless device or a component in said wireless device which acts upon received beacon signal information;

receiving information from which the location of the wireless device associated with the first beacon transmitter can be determined; and changing the stored beacon transmitter information to alter at least the location of the first beacon transmitter based on the location of the wireless device associated with the first beacon transmitter, said wireless device being a mobile wireless terminal which moves over time.

9. The method of claim 8, wherein said information indicating the location of the wireless device associated with the first beacon transmitter includes received signal strength information, the method further comprising:

operating a location determination device to determine the location of the wireless device based on the received signal strength information.

10. The method of claim 9,
wherein said first beacon signal is a virtual group beacon signal;
wherein the first beacon transmitter is a virtual group beacon transmitter;
wherein the wireless device is a first device in a group of devices associated with the virtual group beacon signal, the method further comprising:

updating a location of said first device in stored group information to indicate that the location of the first device is the determined location of the first device; and determining a new location for the virtual beacon transmitter based on locations of devices in said group of devices associated with virtual group beacon signal, said locations of devices including the determined location of the first device.

11. The method of claim 10, further comprising:
determining a transmit power level for the virtual group beacon transmitter based on the location of the devices in the group of devices corresponding to virtual group beacon signal.

12. The method of claim 11, wherein determining the transmit power level includes determining a transmit power level to reach all devices which are members of said group of devices associated with the virtual group beacon signal.

13. The method of claim 11, wherein determining the transmit power level includes:

increasing the transmit power level indicated in said stored information for the virtual group beacon transmitter when device location information indicates that the devices in the group are spread over a larger area than at a last time the virtual group beacon transmitter transmit power was determined; and decreasing the transmit power level indicated in said stored information for the virtual group beacon transmitter when device location information indicates that the devices in the group are spread over a smaller area than at the last time the virtual group beacon transmitter transmit power was determined.

14. The method of claim 1,
wherein the determined transmit power level exceeds a transmit power level permitted by regulations at the indicated location of a virtual group beacon transmitter; and
wherein said storing, changing, determining and communicating steps are performed by a network based beacon server coupled to said wireless device by a wireless communications link.

15. The method of claim 1,
wherein the method is implemented by a beacon server coupled to a wireless communications device by a wireless communications network;

wherein said storing, changing, determining and communicating steps are performed by a beacon server included in said wireless device; and wherein said communicating the message indicating the determined received beacon signal strength includes communicating the message to the component in said wireless device which acts upon received beacon signal information, said component being a beacon signal interface for receiving and processing messages indicating receipt of beacon signals.

16. The method of claim 1 wherein said message indicating the determined received beacon signal strength includes a beacon ID of the beacon signal being reported as being received, a received signal strength of the beacon signal being reported as being received, a received time indicating a time of receipt of the beacon signal being reported as being received.

17. The method of claim 16,
wherein said message further includes a beacon type indicator and a frequency indicator;
wherein said message is transmitted using a different frequency band than the frequency band in which the beacon signal reported as being received is indicated to have been received in; and
wherein the beacon signal reported as being received is a virtual beacon signal which was not received by the wireless device to which said message is sent.

18. A communications device, comprising:
memory including stored beacon transmitter information, said beacon transmitter information including for a first beacon signal, information indicating: i) a location of a first beacon transmitter and ii) a transmit power level of the first beacon signal;
a processor configured to:
determine, based on a location of a wireless device and said information indicating the location of the first beacon transmitter, a beacon signal strength to be reported, said beacon signal strength to be reported being an expected received beacon signal strength of the first beacon signal at the location of said wireless device given the location of said first beacon transmitter indicated by the beacon transmitter information stored in said memory; and
communicate a message indicating the determined received beacon signal strength to the wireless device or a component in said wireless device which acts upon received beacon signal information; and
wherein said processor is further configured to change the stored beacon transmitter information to alter at least one of i) the location of the first beacon transmitter or ii) the transmit power level of the first beacon signal based on at least one of: i) a schedule, ii) a location of a device associated with the first beacon transmitter, iii) a location of a group associated with the first beacon transmitter, iv) a size of geographic area occupied by said group associated with the first beacon transmitter, or v) a rate of motion of a group or individual associated with the first beacon transmitter.

19. The communications device of claim 18, wherein said message is a message reporting receipt of the first beacon signal, said message including in addition to the received beacon signal strength information a beacon identifier or other information indicated in said memory to be communicated by said first beacon signal.

20. The communications device of claim 18,
wherein said wireless device is a mobile wireless terminal which moves over time.

21. The communications device of claim 20, wherein said processor is configured to change the stored beacon transmitter information to alter at least one of i) the location of the first beacon transmitter or ii) the transmit power level of the first beacon signal, based on a first schedule, said first schedule indicating different locations of said first beacon transmitter for different time periods, said processor being further configured to change the stored first beacon transmitter location information to match a location indicated in said first schedule for a current time period.

22. A communications device, comprising:
memory including stored information indicating a location of a first beacon transmitter; and
a processor configured to:
determine, based on a location of a wireless device and said information indicating the location of the first beacon transmitter, a beacon signal strength to be reported, said beacon signal strength to be reported being an expected received beacon signal strength of a first beacon signal at the location of said wireless device given the indicated location of said first beacon transmitter in said memory; and
communicate a message indicating the determined received beacon signal strength to the wireless device or a component in said wireless device which acts upon received beacon signal information;
wherein the wireless device is associated with the first beacon transmitter;
wherein the communications device further comprises a receiver configured to receive information from which the location of the wireless device associated with the first beacon transmitter can be determined; and
wherein said processor is further configured, as part of being configured to change the stored beacon transmitter information to alter at least one of i) the location of the first beacon transmitter or ii) the transmit power level of the first beacon signal, to change the location of the first beacon transmitter based on the location of the wireless device associated with the first beacon transmitter, said wireless device being a mobile wireless terminal which moves over time.

23. The communications device of claim 22, wherein said information indicating the location of the wireless device associated with the first beacon transmitter includes received signal strength information; and
wherein the communications device further comprises: a location determination device configured to determine the location of the wireless device based on the received signal strength information.

24. The communications device of claim 23,
wherein said first beacon signal is a virtual group beacon signal;
wherein the first beacon transmitter is a virtual group beacon transmitter;
wherein the wireless device is a first device in a group of devices associated with the virtual group beacon signal; and
wherein said processor is further configured to:
update a location of said first device in stored group information to indicate that the location of the first device is the determined location of the first device; and
determine a new location for the virtual beacon transmitter based on locations of devices in said group of devices associated with virtual group beacon signal, said locations of devices including the determined location of the first device.

25. A non-transitory computer readable medium for use in a communications device, said non-transitory computer readable medium including processor executable instructions which when executed by at least one processor cause said communications device to:
- store in memory, beacon transmitter information, said beacon transmitter information including for a first beacon signal, information indicating: i) a location of a first beacon transmitter and ii) a transmit power level of the first beacon signal;
- determine, based on the location of a wireless device and information stored in the memory indicating the location of a first beacon transmitter, a beacon signal strength to be reported, said beacon signal strength to be reported being an expected received beacon signal strength of the first beacon signal at the location of said wireless device given the indicated location of said first beacon transmitter indicated by the information stored in said memory;
- communicate a message indicating the determined received beacon signal strength to the wireless device or a component in said wireless device which acts upon received beacon signal information; and
- change the stored beacon transmitter information to alter at least one of i) the location of the first beacon transmitter or ii) the transmit power level of the first beacon signal based on at least one of: i) a schedule, ii) a location of a device associated with the first beacon transmitter, iii) a location of a group associated with the first beacon transmitter, iv) a size of geographic area occupied by said group associated with the first beacon transmitter, or v) a rate of motion of a group or individual associated with the first beacon transmitter.

\* \* \* \* \*